United States Patent
Carter et al.

(10) Patent No.: US 10,406,899 B2
(45) Date of Patent: Sep. 10, 2019

(54) TONNEAU COVER SYSTEM WITH INTERMEDIATE AUTOMATIC LATCHING

(71) Applicants: Extang Corporation, Ann Arbor, MI (US); TruXedo, Inc., Yankton, SD (US)

(72) Inventors: Chad Carter, Manchester, MI (US); Jerome J. Facchinello, Grand Blanc, MI (US); Kelly Kneifl, Yankton, SD (US); Michael R. Spencer, Hubbard, NE (US)

(73) Assignees: Extang Corporation, Ann Arbor, MI (US); TruXedo, Inc., Yankton, SD (US)

( * ) Notice: Subject to any disclaimer, the term of this patent is extended or adjusted under 35 U.S.C. 154(b) by 99 days.

(21) Appl. No.: 15/642,593

(22) Filed: Jul. 6, 2017

(65) Prior Publication Data
US 2019/0009657 A1    Jan. 10, 2019

(51) Int. Cl.
*B60J 7/14*  (2006.01)
*B60J 7/19*  (2006.01)

(52) U.S. Cl.
CPC .............. *B60J 7/198* (2013.01); *B60J 7/141* (2013.01)

(58) Field of Classification Search
CPC . B60J 7/1621; B60J 7/141; B60J 7/198; B60J 7/08; B60J 7/10; B60J 7/102; B60J 7/104; B60J 7/106; B60J 7/19
USPC ..... 410/102, 106, 110, 116, 101; 296/100.7, 296/100.6, 100.2, 57.1, 43, 36, 191, 3, 296/10, 40, 165; 292/38, 201, 53, 339, 292/26, 123, 125, 113, 28
See application file for complete search history.

(56) References Cited

U.S. PATENT DOCUMENTS

| | | | | |
|---|---|---|---|---|
| 5,040,843 A | * | 8/1991 | Russell | B60J 7/068 160/133 |
| 5,350,213 A | * | 9/1994 | Bernardo | B60J 7/041 160/133 |
| 7,537,264 B2 | | 5/2009 | Maimin et al. | |
| 7,823,957 B2 | * | 11/2010 | Williamson | B60J 7/104 292/256 |
| 8,857,887 B1 | * | 10/2014 | Schmeichel | B60P 7/04 296/100.18 |
| 8,939,494 B2 | | 1/2015 | Maimin et al. | |
| 9,211,833 B2 | | 12/2015 | Rusher et al. | |
| 2010/0140973 A1 | * | 6/2010 | Duncan | B60J 7/141 296/100.09 |
| 2011/0062744 A1 | * | 3/2011 | Schrader | B60J 7/10 296/100.18 |

* cited by examiner

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

A tonneau cover has rectangular elements pivotally connected together. An automatic latch can be coupled to a first rectangular element end of one of the rectangular elements. A latch actuator can extend from the automatic latch to a first latch-rearward rectangular element. The first latch rearward element can be rearward of the first rectangular element end. Movement of the first latch-rearward rectangular element relative to the first rectangular element end, as the tonneau cover moves between closed and open positions, can move the latch actuator which moves the first automatic latch between the latched and unlatched configurations, respectively.

34 Claims, 20 Drawing Sheets

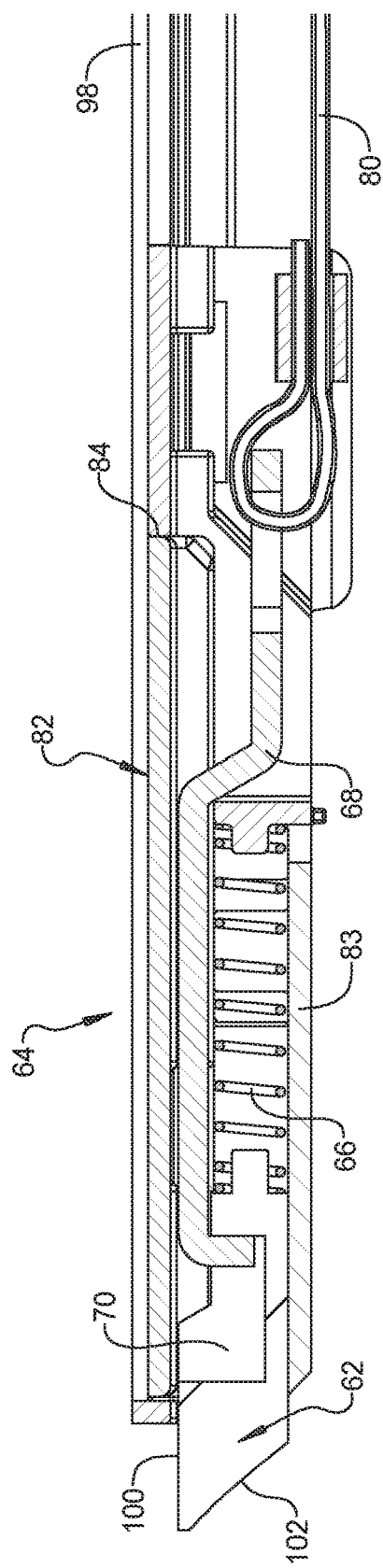

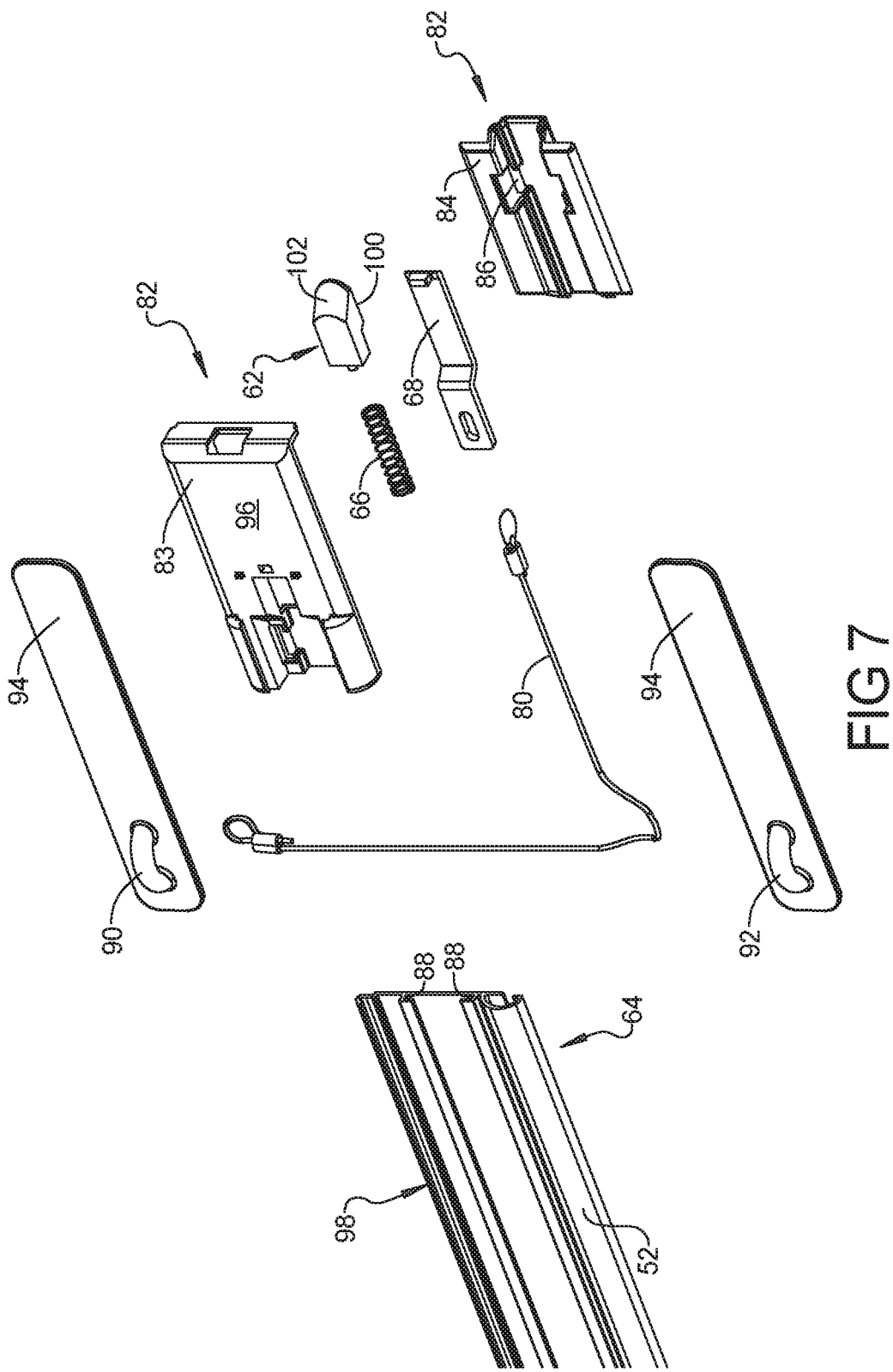

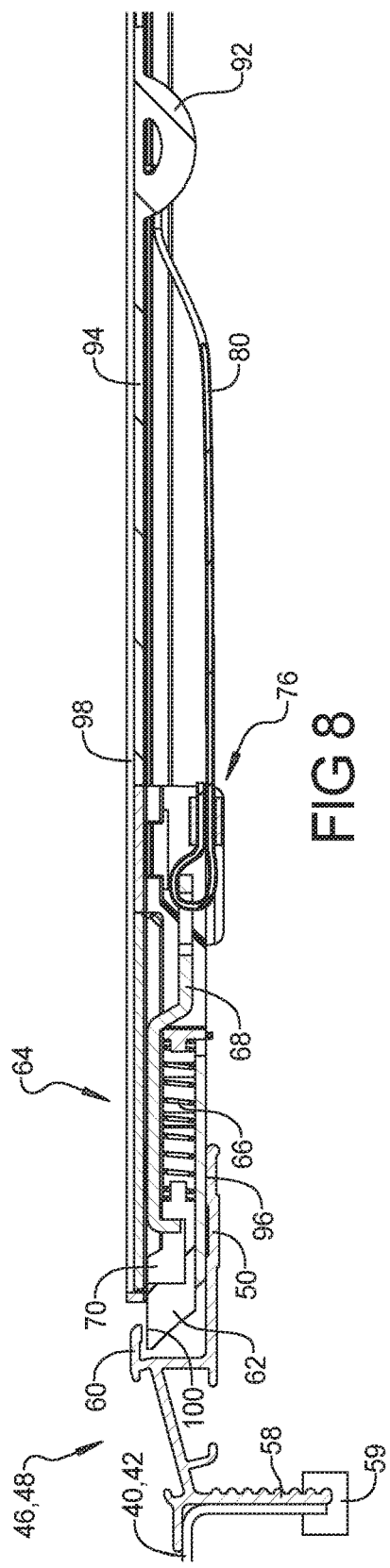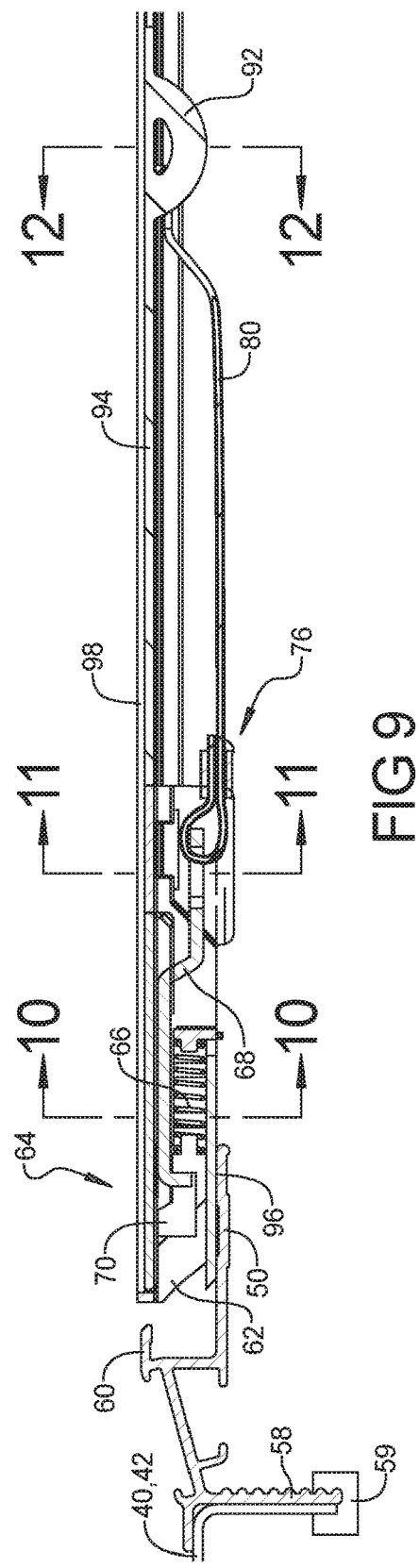

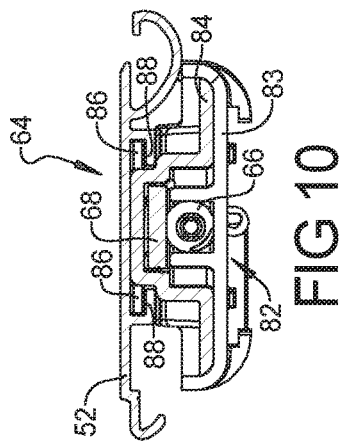
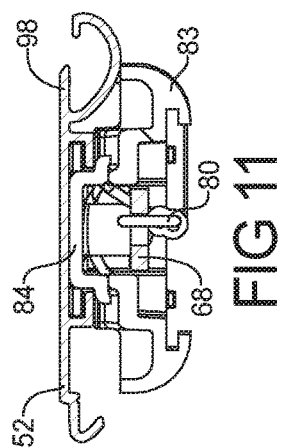
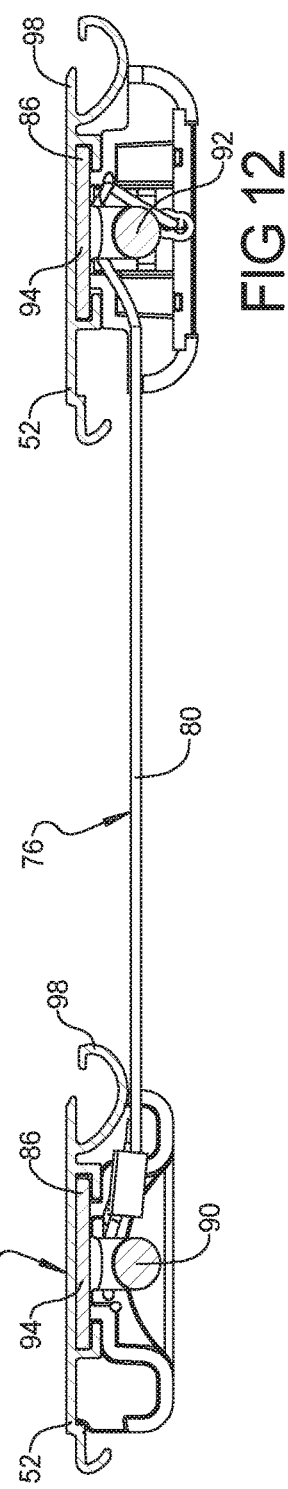

TONNEAU COVER SYSTEM WITH INTERMEDIATE AUTOMATIC LATCHING

FIELD

The present disclosure relates to tonneau cover systems with latches to lock the tonneau cover in a closed or extended configuration.

BACKGROUND

This section provides background information related to the present disclosure which is not necessarily prior art.

Trucks such as pickups having an open top cargo box can be a quite popular type of vehicle because the cargo box enables objects of various sizes to be placed therein and transported. Tonneau cover systems can be used to cover the top of cargo box in a closed or extended configuration to protect the contents against dirt, debris, and other environmental contaminants, and to improve the aesthetic quality thereof.

In some cases, the tonneau covers can be formed of a plurality of rectangular elements in the form of slats that are hingedly coupled together so they can be rolled-up into a tubular compact, storage, open or retracted storage configuration at the front of the cargo box to allow access to the cargo box. In some cases, the tonneau covers can be formed of a plurality of rectangular elements in the form of sections that are hingedly coupled together so they can be folded-up into a stacked compact, storage, open or retracted storage configuration at the front of the cargo box.

A front rectangular element is typically coupled to the sides of the cargo box in the closed or extended configuration to minimize the possibility that the front of the tonneau cover could be pulled upwardly away from the cargo box to allow unauthorized access to the front of the cargo box between the tonneau cover and sides of the cargo box. Similarly, a rear rectangular element typically includes a latch for latching or locking the tonneau cover to at least one side of the cargo box in the closed or extended configuration to minimize the possibility that the rear of the tonneau cover could be pulled upwardly away from the cargo box to allow unauthorized access to the cargo box between the tonneau cover and sides of the cargo box.

Additional protection against unauthorized access could potentially be provided by adding intermediate latches between the rear and front rectangular elements. Such additional intermediate latches, however, would make it unduly cumbersome to open the tonneau cover, since each latch would need to be manually unlatched during opening, and potentially manually latched during closing of the tonneau cover. The cumbersome nature of such an arrangement makes it unlikely that such latches would be consistently used.

SUMMARY

This section provides a general summary of the disclosure, and is not a comprehensive disclosure of its full scope or all of its features.

In accordance with one aspect of the present disclosure, a tonneau cover system can be provided for a truck cargo box including a forward end and a rear end, and first and second side walls therebetween. The tonneau cover system can include a tonneau cover having a plurality of rectangular elements including a forward and a rear rectangular element, and a first and a second latch-rearward rectangular element. The plurality of rectangular elements can have opposite ends supportable by the first and second side walls, respectively. The rectangular elements can be pivotally or hingedly connected together and moveable between a closed position in which the rectangular elements are in an extended configuration to cover the cargo box, and an open position in which the rectangular elements are in a retracted storage configuration to allow access to the cargo box. A first and a second automatic latch can be coupled to a first and a second rectangular element end at a first and a second side of the tonneau cover, respectively. The first and second rectangular element ends can each be an end of any rectangular element intermediate the forward and rear rectangular elements. Each of the first and second automatic latches can have a latched configuration in which each automatic latch is latched to the first and second side walls, respectively, of the cargo box, and an unlatched configuration in which each automatic latch is unlatched from the first and second side wall, respectively. A first and a second latch actuator can extend from the first and second latch, respectively, to the first and second latch-rearward rectangular element, respectively. Each latch-rearward rectangular element can be rearward of the first and second rectangular element end, respectively. Movement of the first latch-rearward rectangular element relative to the first rectangular element end, as the tonneau cover moves between the closed and open positions, can move the first latch actuator which moves the first automatic latch between the latched and unlatched configurations. Movement of the second latch-rearward rectangular element relative to the second rectangular element end, as the tonneau cover moves between the closed and open positions, can move the second latch actuator which moves the second automatic latch between the latched and unlatched configurations, respectively. The first and second latch actuators can be anchored to the first and second latch-rearward rectangular elements, respectively. The first and second latch-rearward rectangular elements can pull against the first and second latch actuators, respectively, to move the first and second latch actuators which moves the first and second automatic latches from the latched to the unlatched configurations or vice versa.

In accordance with another aspect of the present disclosure, a tonneau cover system can be provided for a truck cargo box including a forward end and a rear end, and first and second side walls therebetween. The tonneau cover system can include a tonneau cover having a plurality of rectangular elements including a forward and a rear rectangular element, and a first and a second latch-rearward rectangular element. The plurality of rectangular elements can have opposite ends supportable by the first and second side walls, respectively. The rectangular elements can be pivotally connected together and moveable between a closed position in which the rectangular elements are in an extended configuration to cover the cargo box, and an open position in which the rectangular elements are in a retracted storage configuration to allow access to the cargo box. A first automatic latch can be coupled to a first rectangular element end at a first side of the tonneau cover. The first rectangular element end can be an end of any rectangular element intermediate the forward and rear rectangular elements. The first automatic latch can have a latched configuration in which the first automatic latch is latched to a first side wall of the cargo box, and an unlatched configuration in which the first automatic latch is unlatched from the first side wall. A first latch actuator can extend from the first latch to a first latch-rearward rectangular element. The first latch rearward element can be rearward of the first rectangular element end.

Movement of the first latch-rearward rectangular element relative to the first rectangular element end, as the tonneau cover moves between the closed and open positions, can move the latch actuator which moves the first automatic latch between the latched and unlatched configurations, respectively.

In accordance with yet another aspect of the present disclosure, a tonneau cover system can be provided for a truck cargo box including a forward end and a rear end, and first and second side walls therebetween. The tonneau cover system can include a tonneau cover having a plurality of rectangular elements including a forward and a rear rectangular element, and a first and a second latch-rearward rectangular element. The plurality of rectangular elements can have opposite ends supportable by the first and second side walls, respectively. The rectangular elements can be pivotally connected together and moveable between a closed position in which the rectangular elements are in an extended configuration to cover the cargo box, and an open position in which the rectangular elements are in a retracted storage configuration to allow access to the cargo box. A first and a second automatic latch can be coupled to a first and a second rectangular element end at a first and a second side of the tonneau cover, respectively. The first and second rectangular element ends can each be an end of any rectangular element intermediate the forward and rear rectangular elements. Each of the first and second automatic latches can have a latched configuration in which each automatic latch is latched to the first and second side walls, respectively, of the cargo box, and an unlatched configuration in which each automatic latch is unlatched from the first and second side wall, respectively. A first and a second latch actuator can extend from the first and second latch, respectively, to the first and the second latch-rearward rectangular element, respectively. The first and the second latch-rearward rectangular element can be rearward of the first and second rectangular element end, respectively. Movement of the first latch-rearward rectangular element relative to the first rectangular element end, as the tonneau cover moves between the closed and open positions, can move the first latch actuator which moves the first automatic latch between the latched and unlatched configurations, respectively. Movement of the second latch-rearward rectangular element relative to the second rectangular element end, as the tonneau cover moves between the closed and open positions, can move the second latch actuator which moves the second automatic latch between the latched and unlatched configurations, respectively. During movement between the closed and the open positions, the first and second latch actuators can engage against the first and second latch-rearward rectangular elements, respectively, and the first and second latch-rearward rectangular elements can push against the first and second latch actuators, respectively, to move the first and second latch actuators which moves the first and second automatic latches from the unlatched to the latched configurations or vice versa.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a partial cross-section view of various automatic latch related components of the example tonneau cover system of FIG. 1 in a latched position or configuration.

FIG. 7 is an exploded view of various automatic latch related components of the example tonneau cover system of FIG. 1.

FIG. 8 is a partial cross-section view of various automatic latch related components of the example tonneau cover system of FIG. 1 in a locked or latched position or configuration.

FIG. 9 is a partial cross-section view similar to FIG. 8, with the automatic latch related components in an unlocked or unlatched position or configuration.

FIG. 10 is a cross sectional view taken along line 10-10 of FIG. 9.

FIG. 11 is a cross sectional view taken along line 11-11 of FIG. 9.

FIG. 12 is a cross sectional view taken along line 12-12 of FIG. 9.

Corresponding reference numerals indicate corresponding parts throughout the several views of the drawings.

DETAILED DESCRIPTION

Figure 1:
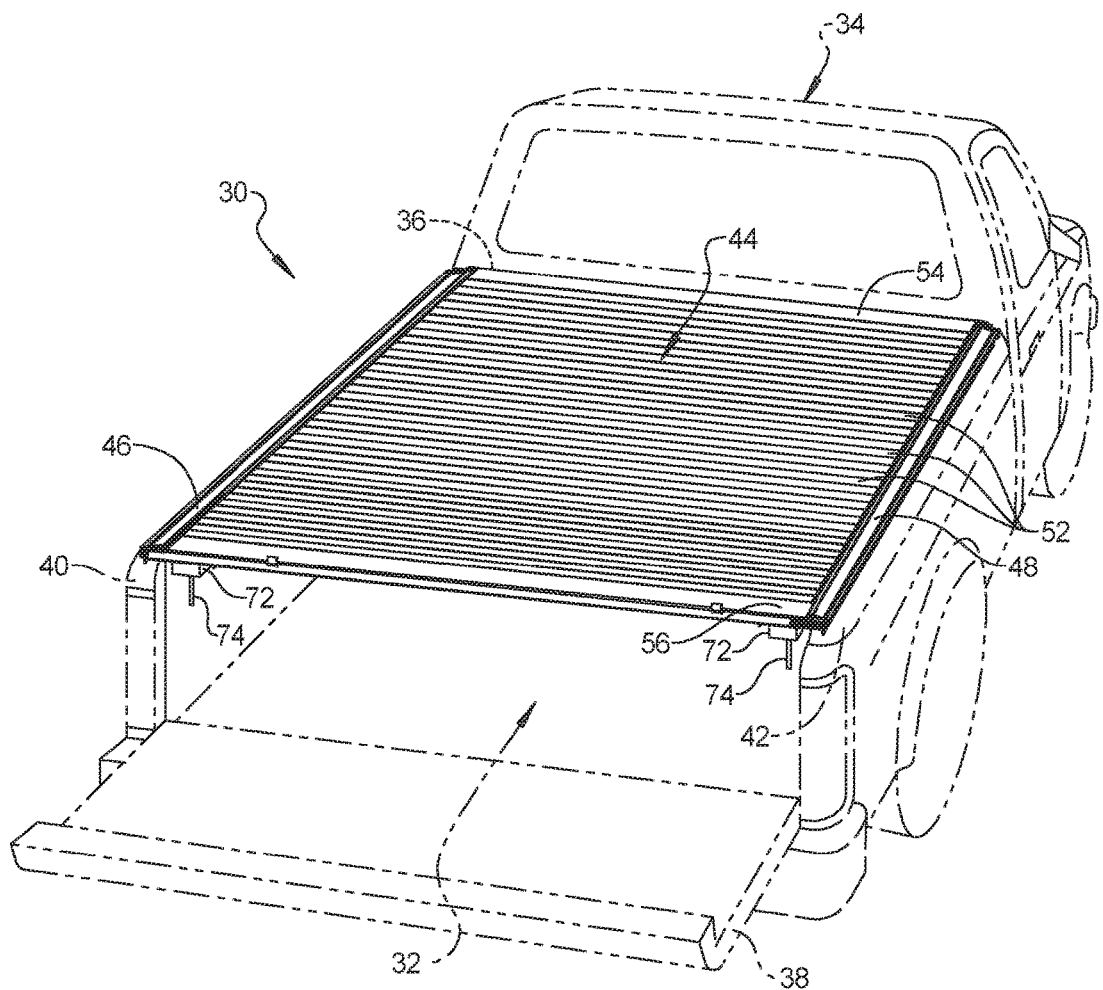
FIG. 1 is a perspective view of a first example embodiment of a tonneau cover system for a truck cargo box in a closed or extended configuration in accordance with the present disclosure.
Figure 2:
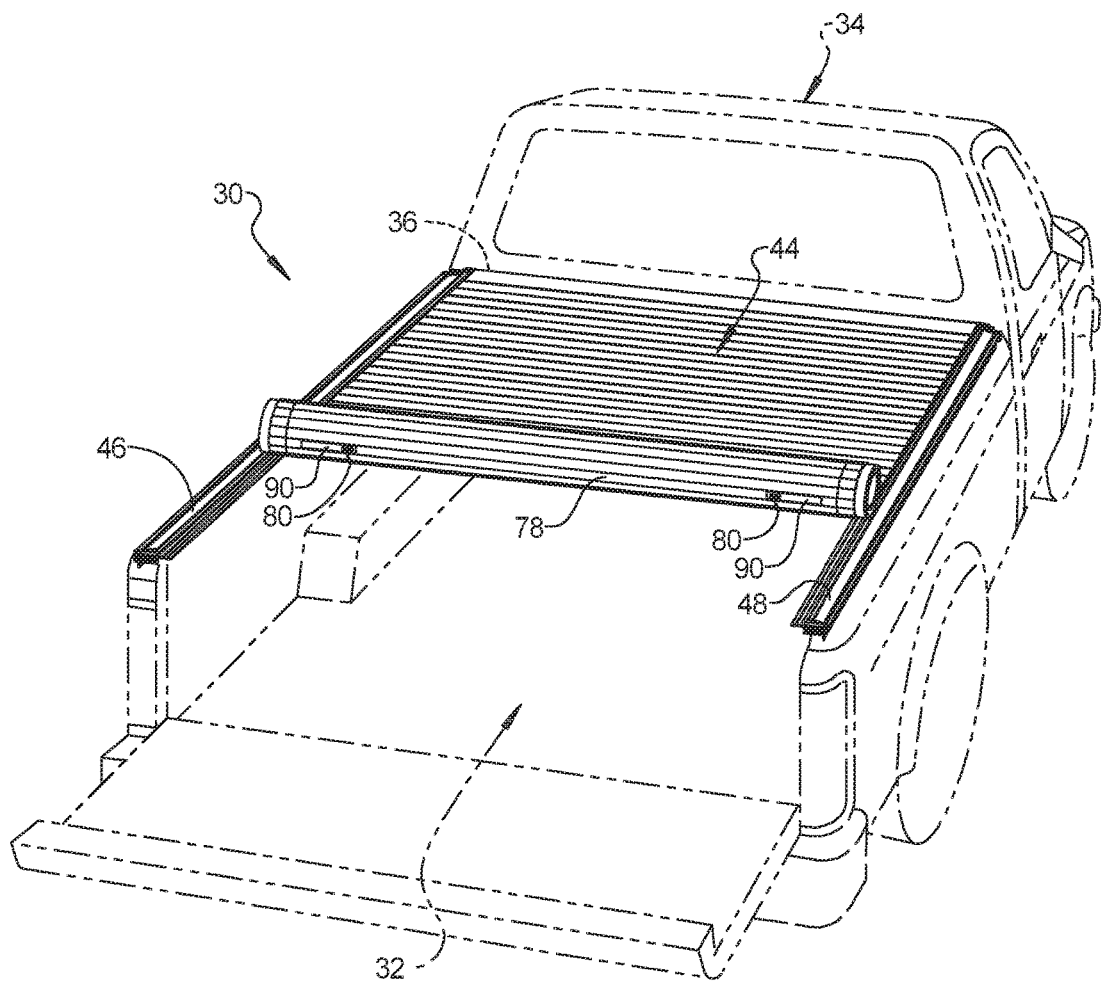
FIG. 2 is a perspective view of the example tonneau cover system of FIG. 1 in an intermediate retracted storage configuration.

Example embodiments will now be described more fully with reference to the accompanying drawings.

FIGS. 1-12 illustrate one example of a tonneau cover system 30 for a cargo box 32 of a truck 34, such as a pick-up truck. The cargo box 32 can include a forward end wall 36 and a rear end wall or tailgate 38, with a first side wall 40 and a second side wall 42 opposite the first side wall 40. The first and second side walls 40, 42 extend longitudinally between opposite ends or sides of the laterally or transversely extending forward and rear walls 36, 38.

Figure 3:
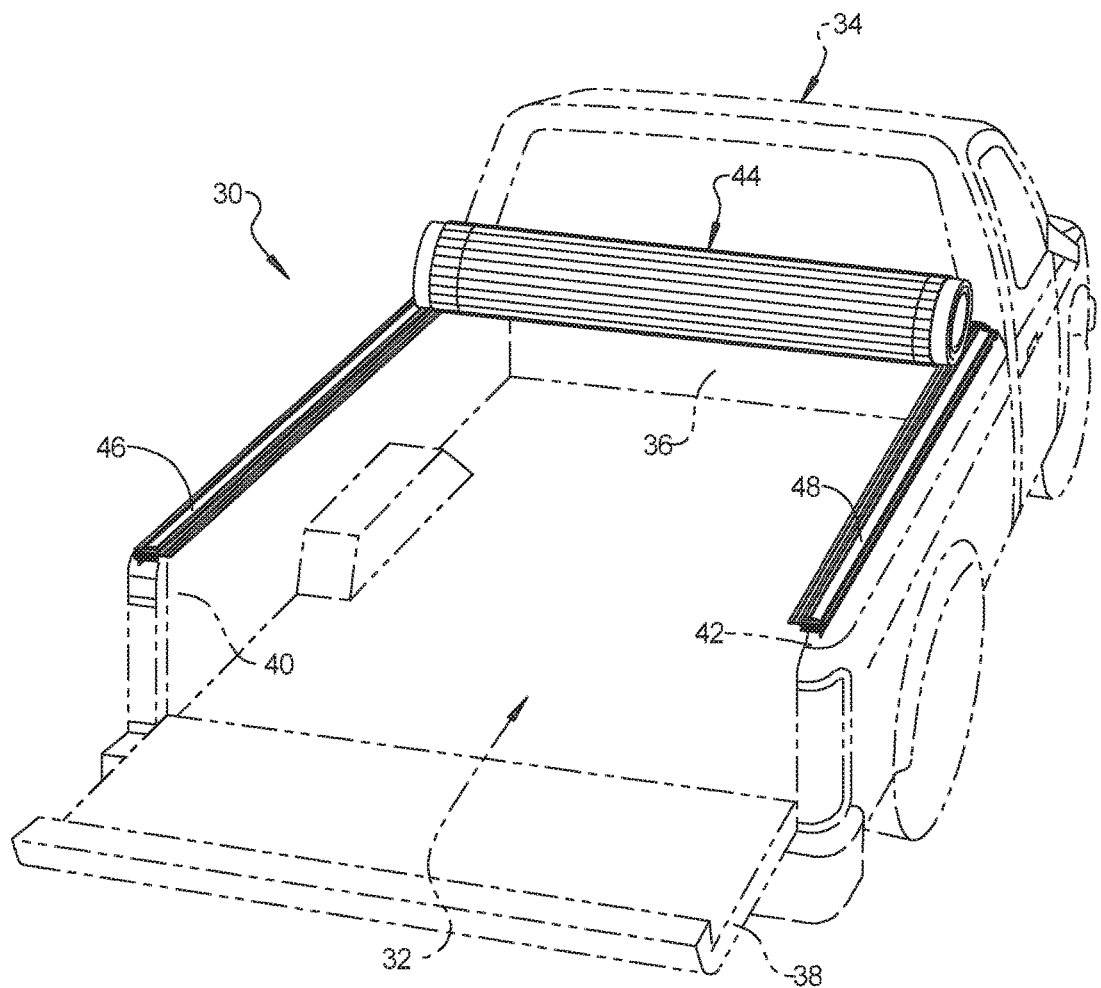
FIG. 3 is a perspective view of the example tonneau cover system of FIG. 1 in an open or retracted storage configuration.
Figure 4:
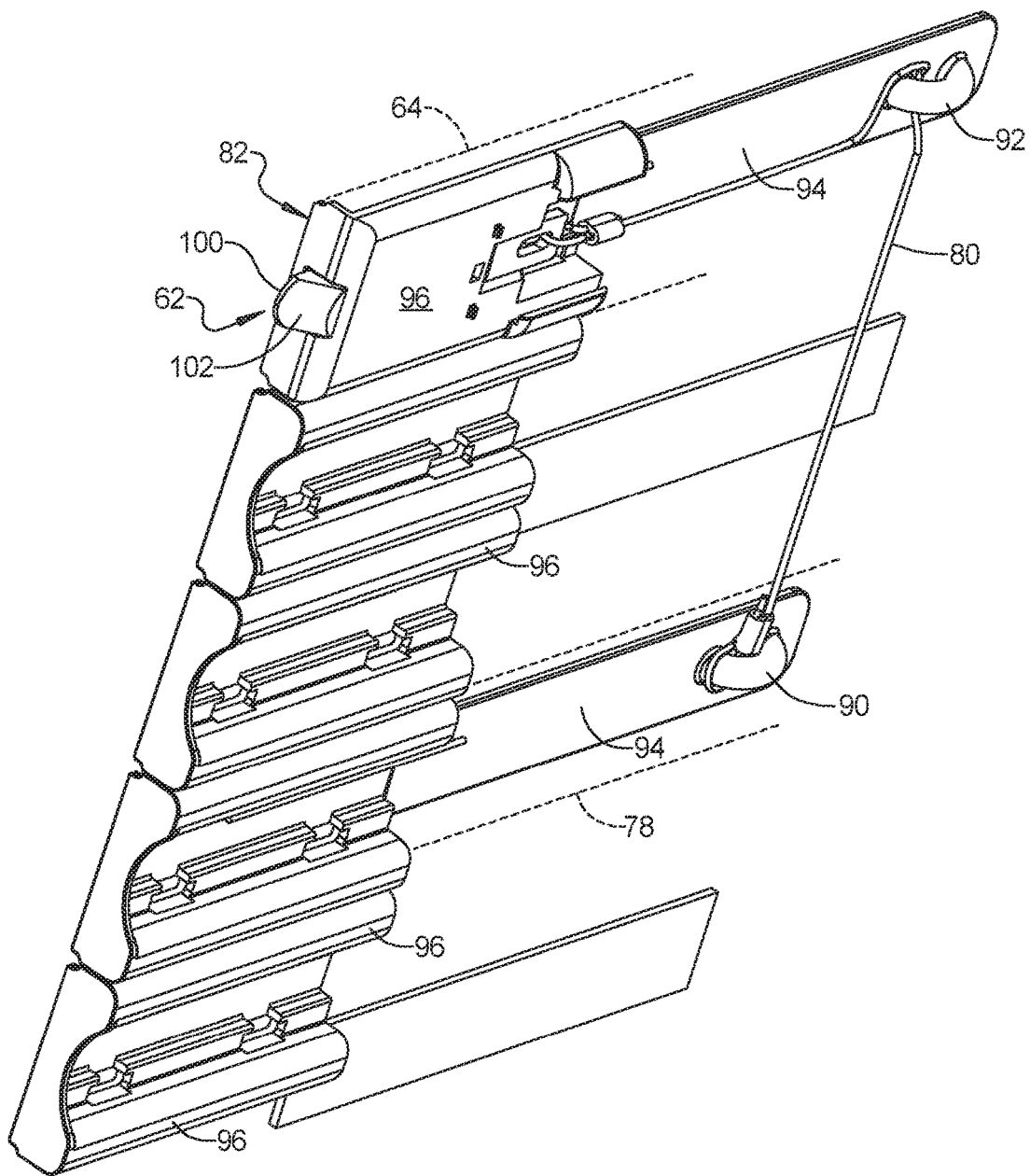
FIG. 4 is a perspective view of various components of the example tonneau cover system of FIG. 1.
Figure 5:
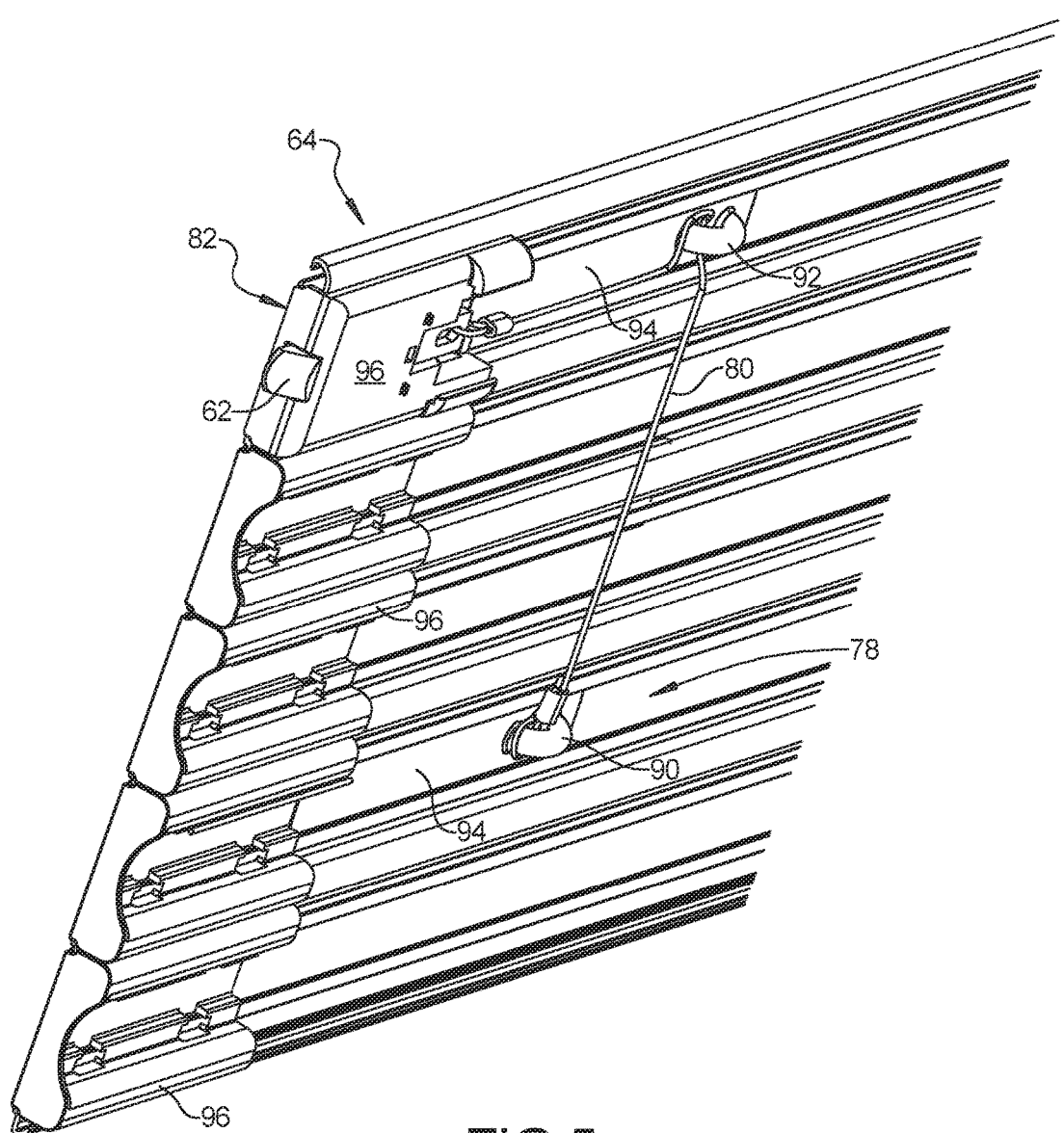
FIG. 5 is a perspective view similar to FIG. 4, including additional components of the example tonneau cover system of FIG. 1.
Figure 13:
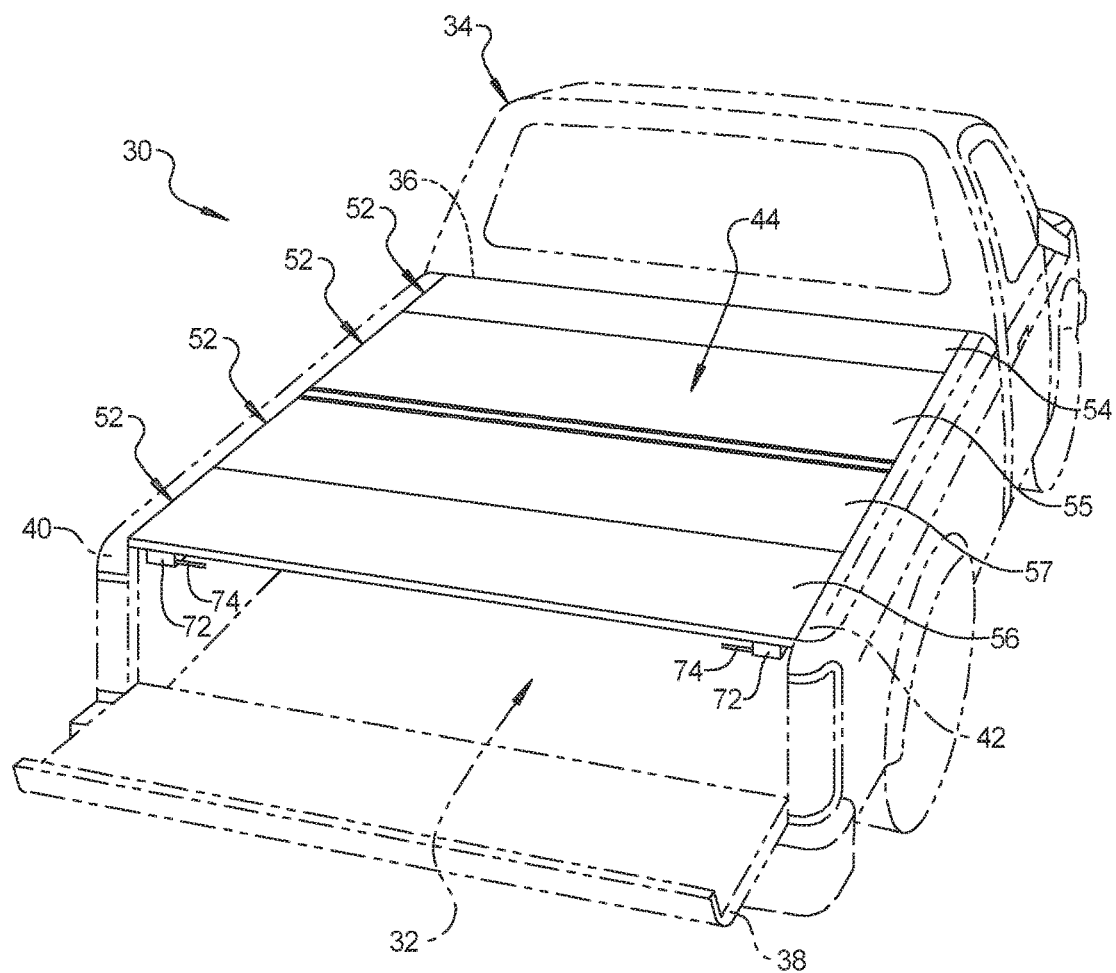
FIG. 13 is a perspective view of a second example embodiment of a tonneau cover system for a truck cargo box in a closed or extended configuration in accordance with the present disclosure.
Figure 14:
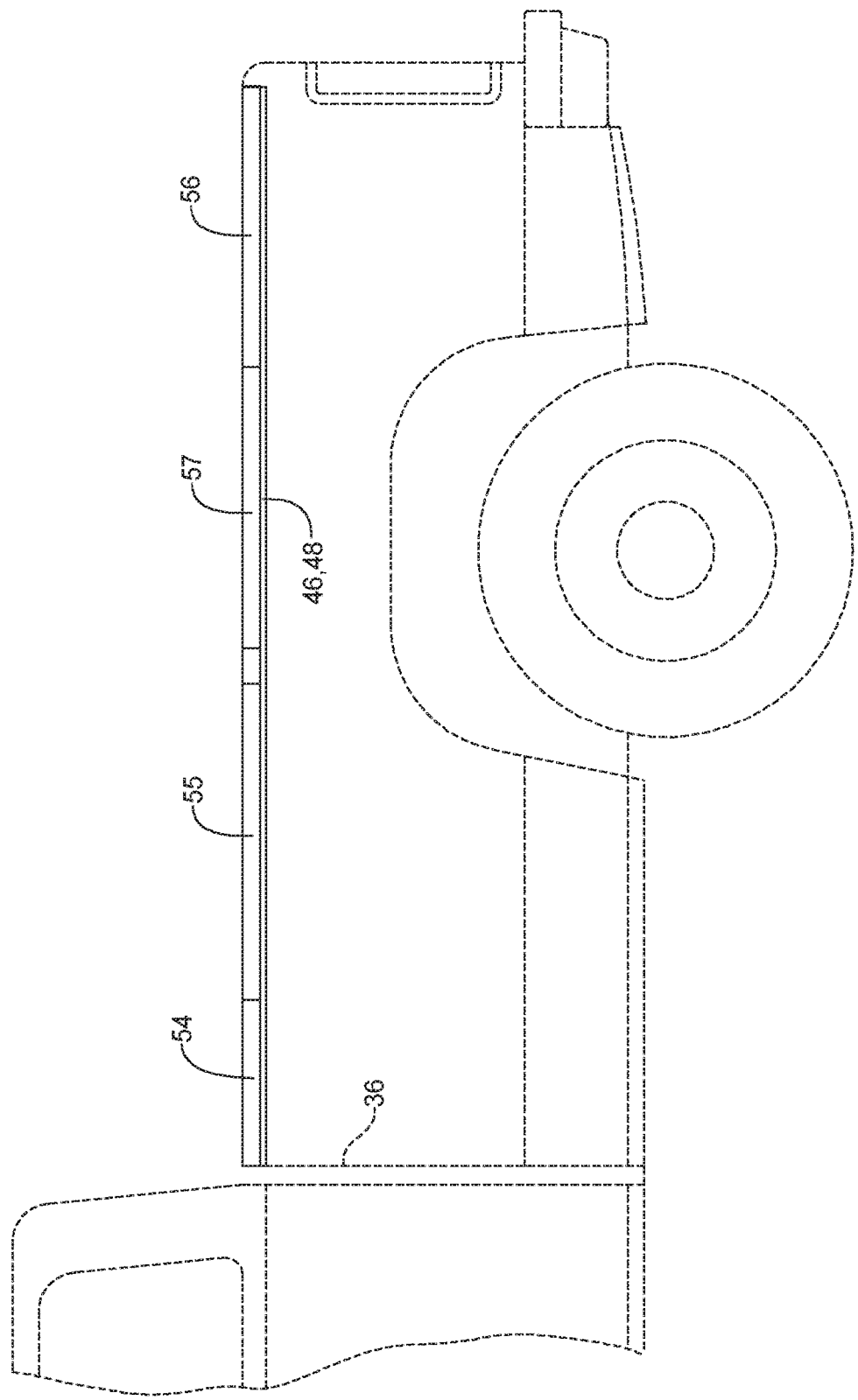
FIG. 14 is a side elevation view of the example tonneau cover system of FIG. 13 in the closed or extended configuration.

A tonneau cover 44 can include a plurality of rectangular elements 52 including a forward rectangular element 54 and a rear rectangular element 56, and respective latch-rearward rectangular elements 78. The plurality of rectangular elements 52 have opposite ends supportable by the first and second side walls, 40, 42, respectively. The rectangular elements 52 are pivotally or hingedly connected together and moveable between a closed position (FIG. 1) and an open position (FIG. 3). In the closed position, the rectangular elements 52 are in an extended configuration (FIG. 1) covering the cargo box 32. In the open position, the rectangular elements 52 are in a retracted storage configuration (FIG. 3) that allows access to the cargo box 32.

As in this example embodiment, most or all of the rectangular elements 52 can be slats and the tonneau cover 44 can be a roll-up tonneau cover. The slats 52 can include a main extruded member 98 with an end cap or housing 82 provided along each end of the slat 52, or each side of the tonneau cover 44.

The forward rectangular element 54 can remain coupled to the side walls 40, 42 in both the extended configuration (FIG. 1) and the retracted storage configuration (FIG. 3). The rear rectangular element 56 can have at least one manual latch 72. The manual latch 72 can be latched or locked to one or both side walls 40, 42 of the cargo box 32 when the tonneau cover 44 is in the extended configuration (FIG. 1). The manual latch 72 can be similar to the automatic latches 62, and can similarly engage the latching flange 60 as described hereinafter. In some embodiments, the manual latch 72 can be a slam latch so that it automatically latches when the tonneau cover 44 is in the extended or closed configuration (FIG. 1). Instead of an automatic actuator, however, the manual latches 72 include a grasping portion 74, which a user grasps and manipulates in order to individually or simultaneously move the manual latch(s) 72 of the rear slat 56 into an unlatched or unlocked position. This allows movement of the tonneau cover from the extended configuration (FIG. 1) toward the retracted storage configuration (FIG. 3) to be initiated from the rear slat 56.

The tonneau cover system can include a first side rail 46 and a second side rail 48. The first and second side rails 46, 48 can be identical and are designed to be coupled to, and to extend longitudinally along, the first and second side walls 40, 42, respectively. For example, the side rails 46, 48 can be clamped to the side walls 40, 42 with a clamp 59 engaging a clamping flange 58 of the corresponding side rail 46, 48. Opposite ends of the plurality of rectangular elements 52 can be supported on respective support flanges 50 of the first and second side rails 46, 48. Thus, opposite ends of the plurality of rectangular elements 52 can be indirectly supported by the first and second side walls 40, 42 via the side rails 46, 48.

The manual latch 72 can be latched or locked to one or both side walls 40, 42. Each side rails 46, 48 can include a latching flange 60 positioned above the support flange 50. The manual latch 72 can be indirectly latched to a respective side wall 40, 42 by being latched to the respective side rails 46, 48. Similarly, the forward rectangular element 54 can be indirectly coupled to the side walls 40, 42 by being coupled to the side rails 46, 48.

One or more automatic latches 62 can each be coupled to a corresponding rectangular element end 64 of the tonneau cover 44. Each rectangular element end 64 having an automatic latch 62 can be an end of any rectangular element 52 intermediate the forward and rear rectangular elements 54, 56. Each automatic latch 62 can have a latched configuration (FIG. 8) in which the automatic latch 62 is latched or locked to a corresponding side wall 40 or 42 of the cargo box 32. Each automatic latch 62 can have an unlatched configuration (FIG. 9 in which the automatic latch 62 is unlatched or unlocked from the corresponding side wall 40 or 42 of the cargo box 32). Each automatic latch 62 can be latched to the latching flange 60 of the corresponding side rail 46, 48 in the latched configuration. Thus, each automatic latch 62 can be indirectly latched or locked to the corresponding side walls 40, 42 via the side rails 46, 48. For example, the automatic latch 62 can have a latching surface 100 that is positioned adjacent to, and captured by, the latching flange 60 when the cover 44 is in the extended configuration and the automatic latch 62 is in the locked or latched position or configuration. As with this example embodiment, at least one automatic latch 62 can be provided on each of the opposite longitudinal sides of the tonneau cover 44 to help prevent unauthorized access to the cargo bed 32 by lifting either longitudinal side of the tonneau cover 44.

A latch actuator 76 can extend from each automatic latch 62 to a corresponding latch-rearward rectangular element 78, which is rearward of the rectangular element end 64 to which the corresponding automatic latch 62 is mounted. As in this example embodiment, the latch actuator 76 can include a coupling arm 68, and a cable 80. A biasing member 66, such as the illustrated spring, can be provided to bias the automatic latch 62 and latch actuator 76 toward corresponding latched or locked positions (FIG. 8). The coupling arm 68 can engage a slot 70 of the automatic latch 62 to enable the coupling arm 68 to pull against the spring 66 to move the automatic latch 62 inward toward its unlatched or unlocked position (FIG. 9).

The automatic latch 62 and the coupling arm 68 can be supported by a housing 82, which can include two housing components 83, 84. The housing 82 can include coupling flanges 86, such as tabs, that engage into cooperating slots 88 of the slat 52 to couple the automatic latch 62 to the slat 52. The cable 80 can extend from the coupling arm 68 and is anchored at its opposite end to the corresponding slat 52 via a terminal anchor 90. The cable 80 can pass around an intermediate anchor 92 that operates as an actuator guide. The anchors 90, 92 can each be similarly coupled to the corresponding slat 52 via flanges 86, such as peripheral sides of a base plate 94, that engage into cooperating slots 88.

As in this example embodiment, the cable 80 can have an initial or first portion, between the automatic latch 62 and the intermediate anchor 92, that extends in a first direction that is substantially parallel to a longitudinal direction of the slats 52. This first direction is also substantially parallel to the transverse or lateral direction of the tonneau cover 44 and cargo box 32. This first direction is also substantially transverse to the longitudinal direction of the tonneau cover 44 and cargo box 32. In addition, the cable 80 can have a second or terminal section, between the automatic latch 62 and the intermediate anchor 92, that extends in a second direction that is substantially perpendicular to the first direction. It is worth noting that any apparent kinks in the cable 80 of the drawings are merely drawing artifacts, and are not actually present in the physical cable 80.

As the tonneau cover 44 moves between the closed and open positions, the relative hinging movement of the latch-rearward slats 78 relative to the slat end 64 to which the respective automatic latch 62 is mounted results in the terminal anchor 90 effectively moving away from the intermediate anchor 92 and from the automatic latch 62. Thus, the relative hinging movement of the slats 52 while rolling-up the tonneau cover 44 causes the respective latch-rearward slats 78 to pull the cable 80 and the automatic latch 62, moving them into corresponding unlatched or unlocked positions or configurations. Thus, there is no need to separately manually operate the automatic latches. The act of rolling up the tonneau cover 44 alone automatically unlatches each automatic latch 62. Similarly, the act of unrolling the tonneau cover 44 alone can automatically latch each automatic latch 62. In some embodiments, the automatic latches 62 can be slam latches so that they automatically latch when the tonneau cover 44 is in the extended or closed configuration (FIG. 1).

In some embodiments, there is at least one intermediate automatic latch 62 on each of the opposite sides of the tonneau cover 44. Each of these automatic latches 62 can have separate cables 80 that are independently anchored to the corresponding latch-rearward rectangular elements 78. In some embodiments, the rectangular element ends 64 for these opposite automatic latches 62 can be opposite ends of the same rectangular element 52. In some embodiments, multiple automatic latches 62 can share the same corresponding latch-rearward rectangular element 78, which in the illustrated embodiment carries the terminal anchor 90.

As in the illustrated embodiment, the rectangular elements or slats 52 can have lower surfaces 96 upon which the tonneau cover 44 rests when in a closed or extended configuration (FIG. 1) covering the cargo box 32. As in this embodiment, these lower surfaces 96 can rest upon the upper surface of the support flanges 50. In addition, each automatic latch 62 can have a latching surface 100. The latching surface 100 can be positioned higher than the lower surfaces 96 of the slats 52. As in this embodiment, the latching surface 100 of the automatic latches 62 can engage against the lower side or surface of the latching flange 60 when the tonneau cover 44 is in the extended configuration and the automatic latches 62 are in the latched configuration or position.

Each automatic latch 62 can have the characteristics of a slam latch, including a slam surface 102. As each slat 52 moves into its closed position or extended configuration, the slam surface 102 can engage the latching flange 60 of the side rail 46. This engagement of the slam surface 102 against the side rail 46 causes the automatic latch 62 to move inward against the outward biasing force of the spring 66. When the automatic latch 62 passes the latching flange, the biasing force of the spring 66 moves the automatic latch 62 outward into the latched configuration with the latching surface 100 adjacent to, and captured by, the latching flange 60.

The slats 52 can include a main extruded member 98 and an end cap provided by the housing 82. Each automatic latch 62 can extend outward from the main extruded member through the end cap of the housing 82. Additionally or alternatively, each latch automatic 62 can be slidably supported within a channel of the main extruded member 98 and can extend from a distal end of the channel. In some embodiments, the latch can be mounted to extend through an end cap of an extruded slat 52, or can simply be mounted in a channel of an extruded slat 52.

The manual latch or latches 72 of the rear slat 56 can be slam latches that are identical to those of the automatic latches 62 described above. For example, a manual latch 72 can be provided on each end of the rear slat 56. A manual latch actuator can include the cable 80 extending between the coupling arms 68 of the two manual latches 72. The grasping portion 74 can be provided by the cable 80 itself, or by a separate extension coupled to the cable 80. The cable can extend through two intermediate anchors spaced adjacent one side of the cargo box 32, so that a user can simultaneously unlatch both manual latches 72 from a single location adjacent the side of the cargo box 32. Then, as the slats 52 are moved toward their open position, and the tonneau cover 44 is moved toward its retracted storage configuration, the automatic latches 62 move into their unlatched position without requiring any other manual action by the user.

FIGS. 13-26 illustrate another example of a tonneau cover system 30 for a cargo box 32 of a truck 34, such as a pick-up truck. Corresponding elements of this embodiment use the same reference numbers as those used with respect to the prior example embodiment, regardless of whether the corresponding elements are identical or not. For brevity, aspects in common between the two embodiments will not necessarily be repeated below.

The tonneau cover 44 of the tonneau cover system 30 can include a plurality of rectangular elements 52 pivotably or hingedly coupled together in series. In some embodiments, the pivotable coupling or hinge between any of the adjacent rectangular elements 52 can include a flexible member coupled between adjacent rectangular elements 52. In some embodiments, the pivotable coupling or hinge between any of the adjacent rectangular elements 52 can additionally or alternatively include cooperating interlocking rigid elements (not shown) of adjacent rectangular elements 52 that engage each other.

Figure 16:
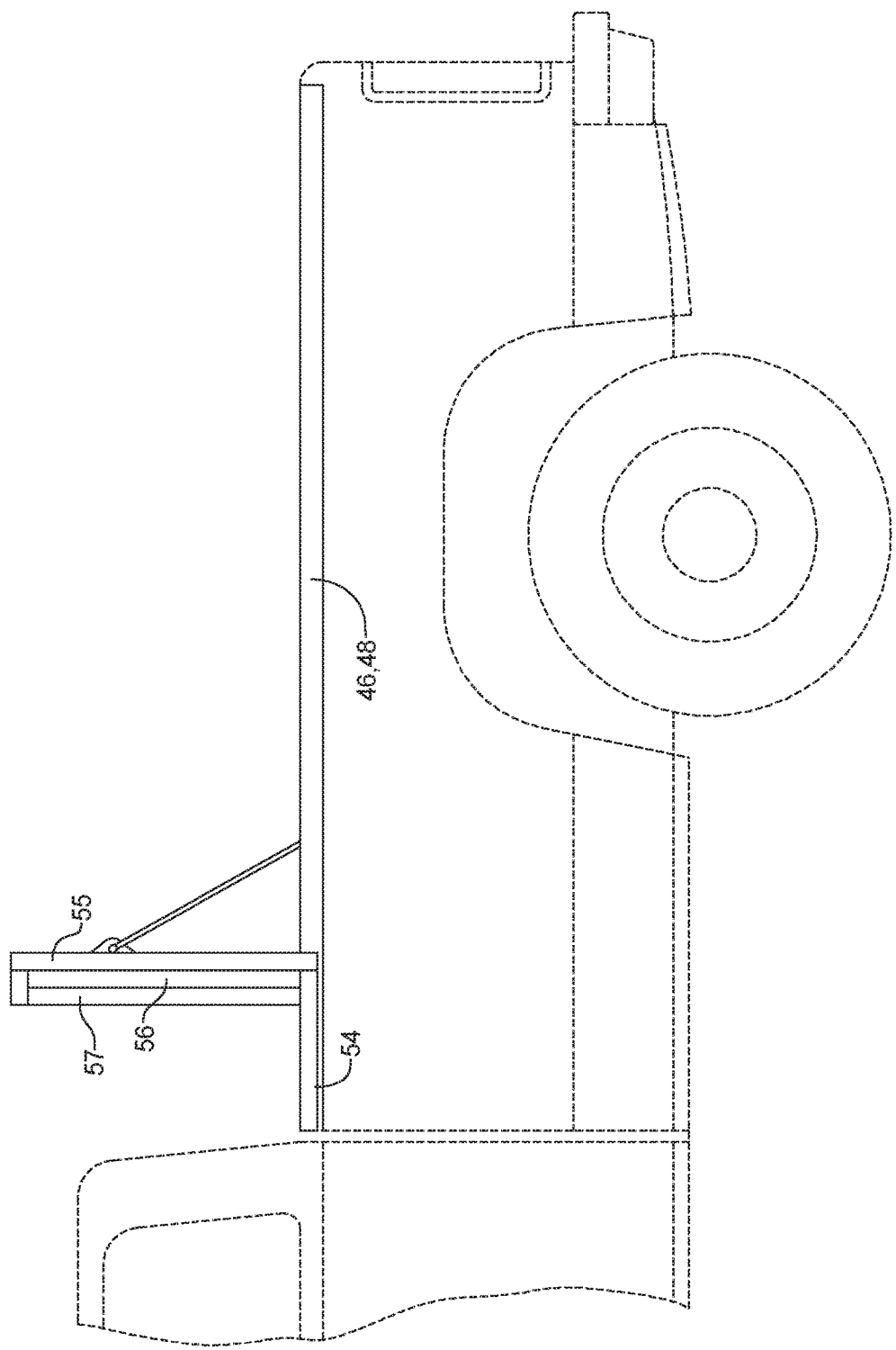
FIG. 16 is a side elevation view of the example tonneau cover system of FIG. 13 in a fully open or retracted storage configuration.

The tonneau cover 44 can include a plurality of rectangular elements 52 including a forward rectangular element 54 and a rear rectangular element 56, and respective latch-rearward rectangular elements 78. The plurality of rectangular elements 52 have opposite ends supportable by the first and second side walls, 40, 42, respectively. The rectangular elements 52 are pivotally or hingedly connected together and moveable between a closed position (FIGS. 13 and 14) and an open position (FIG. 16). In the closed position, the rectangular elements 52 are in an extended configuration (FIGS. 13 and 14) covering the cargo box 32. In the open position, the rectangular elements 52 are in a retracted or storage configuration (FIG. 13) that allows access to the cargo box 32.

As in this example embodiment, most or all of the rectangular elements 52 can be panels or sections and the tonneau cover 44 can be a fold-up tonneau cover 44. In some cases, each panel 52 can comprise a central rigid panel and can include rigid frame elements bounding its periphery. In some cases, each section 52 can comprise a rigid rectangular frame that can be covered by a flexible sheet material.

The forward rectangular element 54 can remain coupled to the side walls 40, 42 in both the extended configuration (FIG. 1) and the retracted storage configuration (FIG. 3). The rear rectangular element 56 can have at least one manual latch 72. The manual latches 72 can be latched or locked to one or both side walls 40, 42 of the cargo box 32 when the tonneau cover 44 is in the extended configuration (FIGS. 13 and 14) as generally described above. Also as generally described above, one or more automatic latches 62 can each be coupled to a corresponding rectangular element end 64 of the tonneau cover 44. Each rectangular element end 64 having an automatic latch 62 can be an end of any rectangular element 52 intermediate the forward and rear rectangular elements 54, 56.

As in this embodiment, any manual latches 72 and any automatic latches 62 can have many aspects in common. For example, each of the manual latches 72 and the automatic latches 62 can comprise an elongate member. The elongate member latches 62, 72 can include a plurality of angled slots 70 therein. The latch actuator 76 can include an elongate arm 80, which can have a corresponding plurality of pins 69 that ride within the slots 70. Each latch 62, 72 and the latch actuator 76 can be supported within a housing 82, which can include an elongate extruded member 84. The housing 82 can include fixed end caps 83, 85 that effectively prevent longitudinal movement of each latch 62, 72 with its respective housing 82. Each latch 62, 72, however, is supported within the housing 82 so that it is permitted to move laterally between its latched configuration (FIGS. 21 and 22) and its unlatched configuration (FIGS. 19 and 20).

Figure 19:
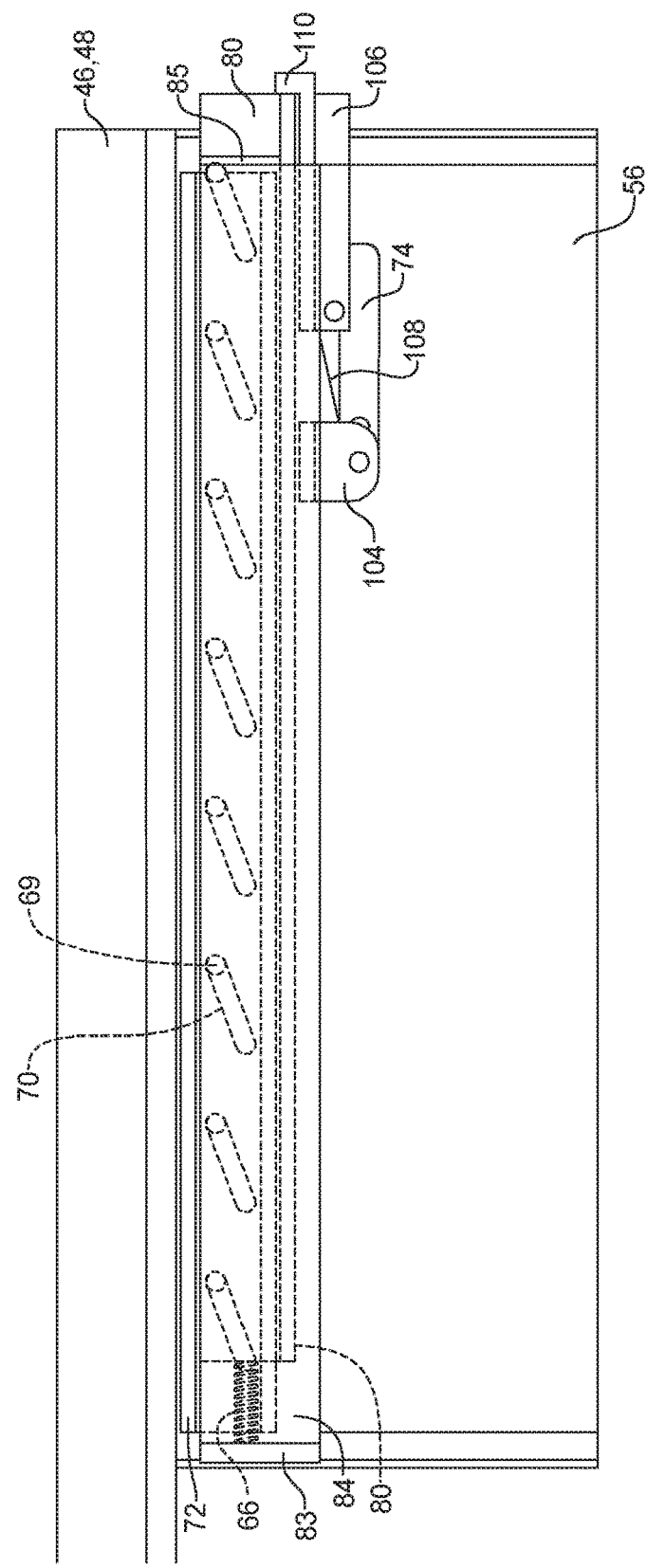
FIG. 19 is top plan view of the manual latch of FIG. 17 and related components in an unlocked or unlatched position or configuration.
Figure 20:
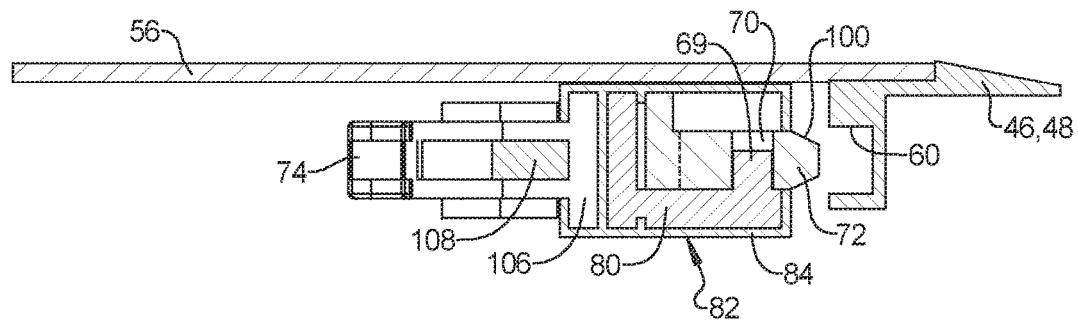
FIG. 20 is a partial cross sectional view of the manual latch of FIG. 17 and related components in the unlocked or unlatched position or configuration.
Figure 22:
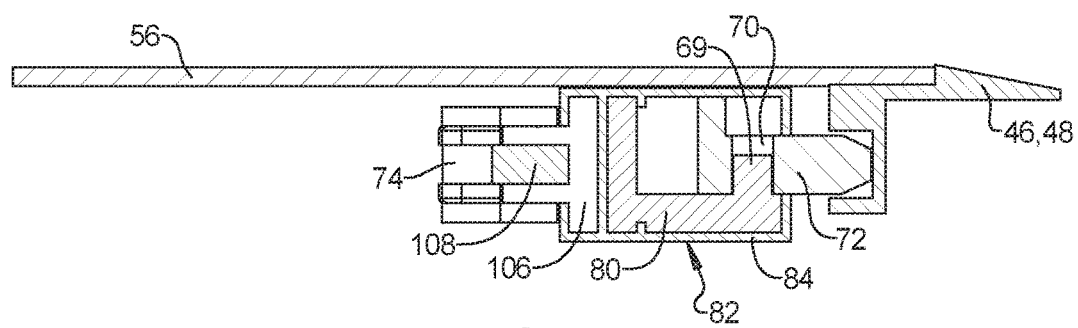
FIG. 22 is a partial cross sectional view of the manual latch of FIG. 17 and related components in the locked or latched position or configuration.
Figure 21:
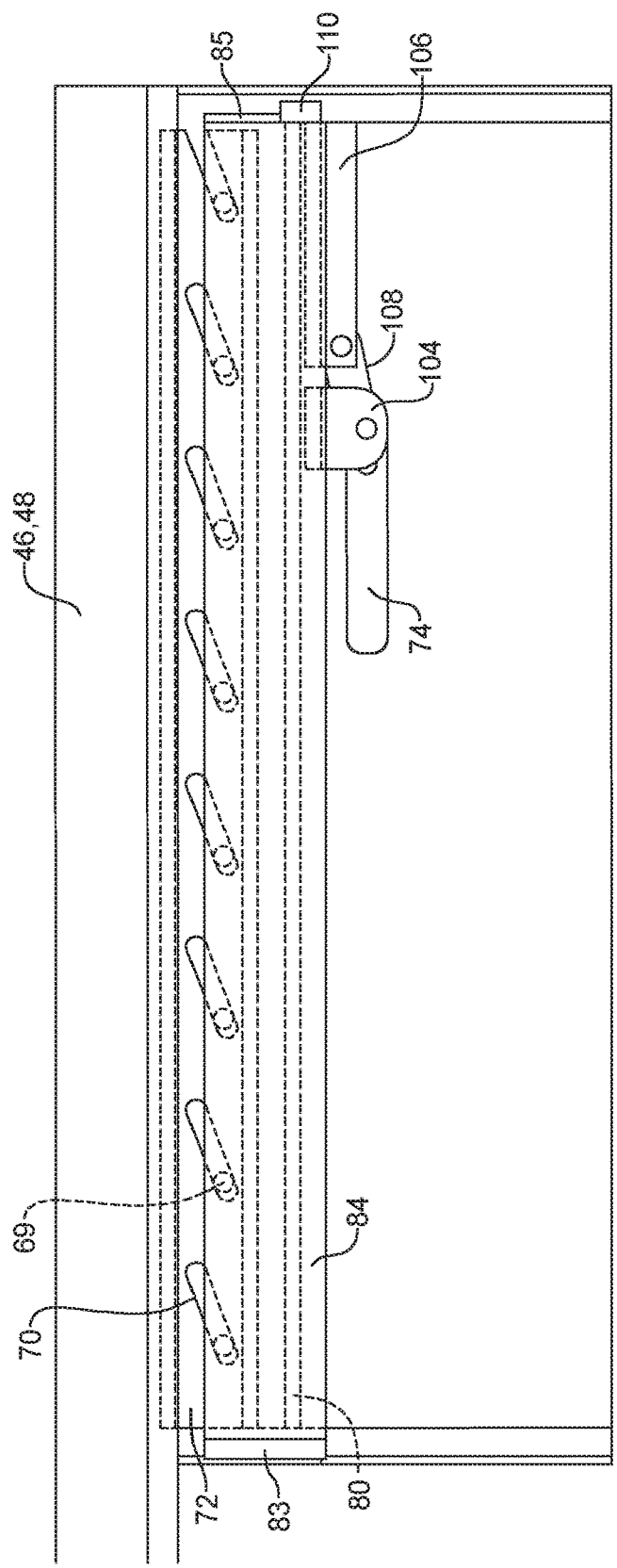
FIG. 21 is top plan view of the manual latch of FIG. 17 and related components in a locked or latched position or configuration.

In contrast, the latch actuator arm 80 is supported within the housing 82 so that it is essentially prevented from moving laterally, but is permitted to move longitudinally between its corresponding latched position or configuration (FIGS. 21 and 22) and its corresponding unlatched position or configuration (FIGS. 19 and 20). A biasing member or spring 66 can be provided, e.g., between the forward fixed end cap 83 and the latch actuator arm 80, to bias the arm 80 toward its unlatched configuration. This, in turn, biases the latch 62, 72 into its corresponding unlatched configuration, due to the interaction of the pins 69 and the slots 70.

Figure 17:
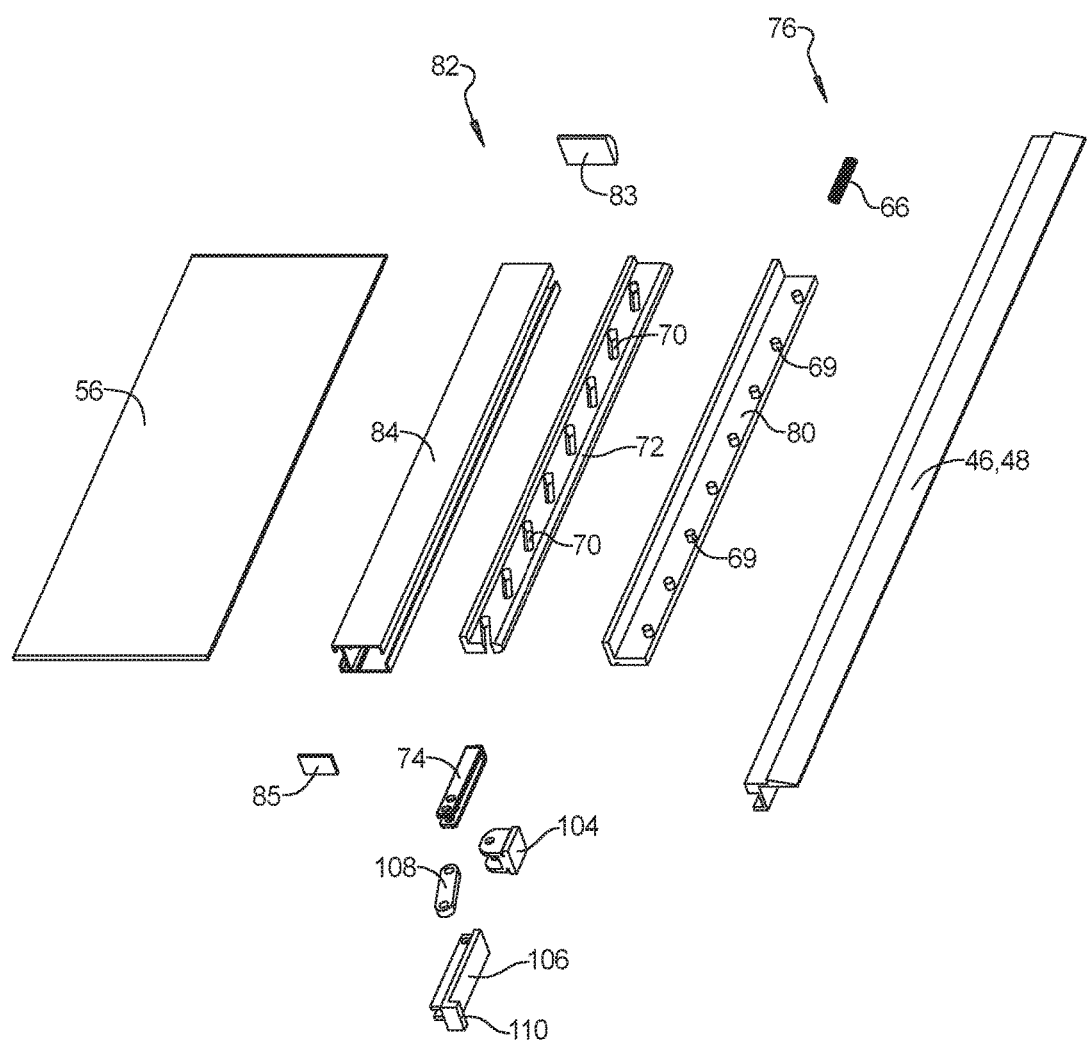
FIG. 17 is an exploded view of a manual latch and related components of the example tonneau cover system of FIG. 13.

The manual latches 72 of FIG. 17 can be mounted to and carried by the rear rectangular element 56 and can include a grasping portion or handle 74. The grasping portion 74 can be coupled to a fixed base 104 and to a slider 106 via a link 108. The biasing member 66 can bias the latch actuator arm 80 against a foot 110 of the slider 106. Movement of the grasping portion 74 can cause longitudinal sliding movement of the slider 110 and, therefore, of the latch actuator 80 and manual latch 72 between the corresponding latched and unlatched configurations.

Figure 18:
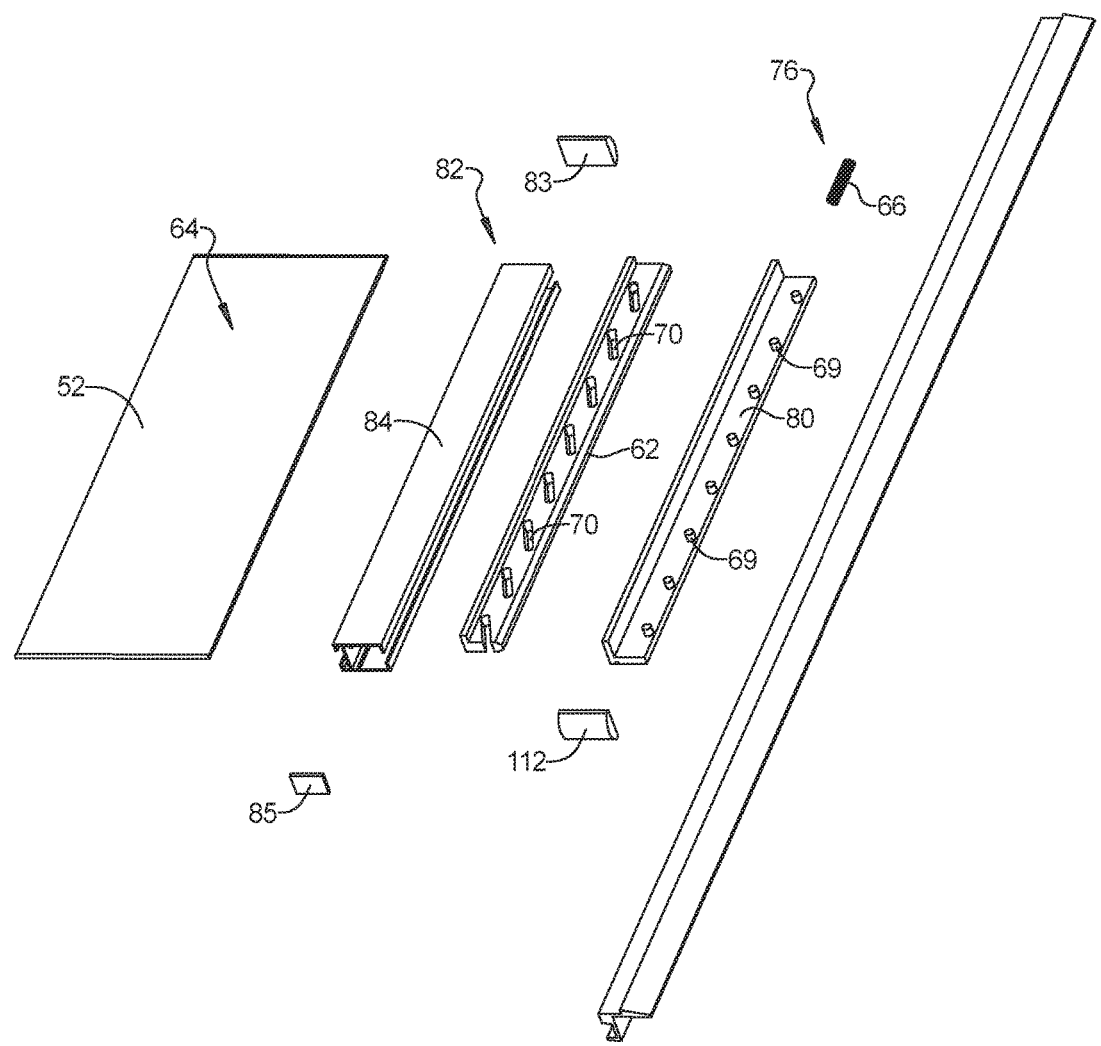
FIG. 18 is an exploded view of an automatic latch and related components of the example tonneau cover system of FIG. 13.

The automatic latches 62 of FIG. 18 can be mounted to a rectangular element end 64 of a rectangular element between the forward and rear rectangular elements 54 and 56, respectively. The automatic latches 62 can have many components in common with the manual latches 72, as described above. Instead of the grasping portion 74 and related components, however, the latch actuator 76 of the automatic latches 62 can include a bumper 112 fixed to a rearward end of the latch actuator arm 80 for movement therewith.

Figure 25:
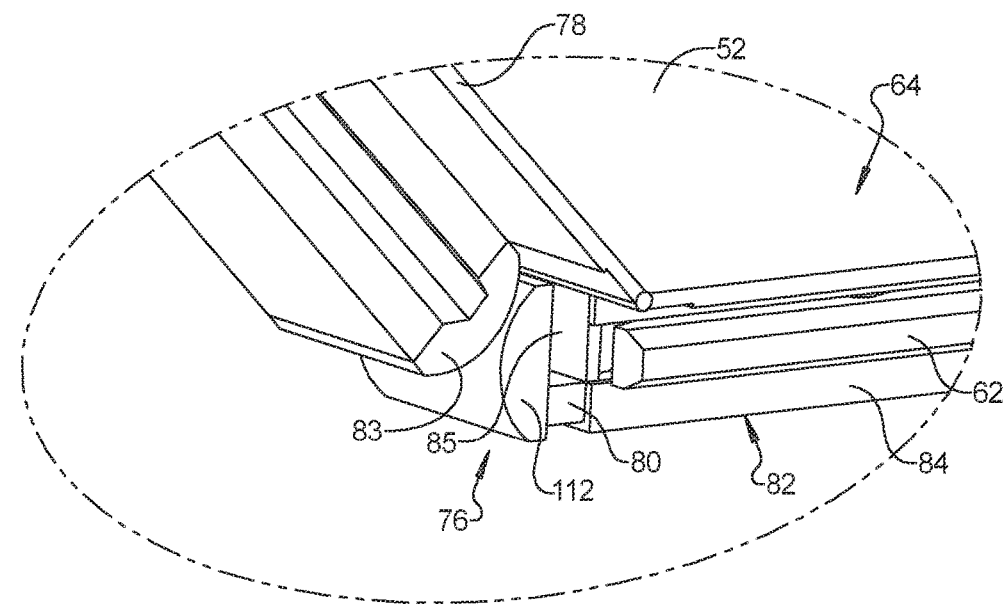
FIG. 25 is a partial perspective view of the automatic latch of FIG. 18 and related components, including a corresponding latch-rearward rectangular element, in or near an unlocked or unlatched position or configuration.
Figure 26:
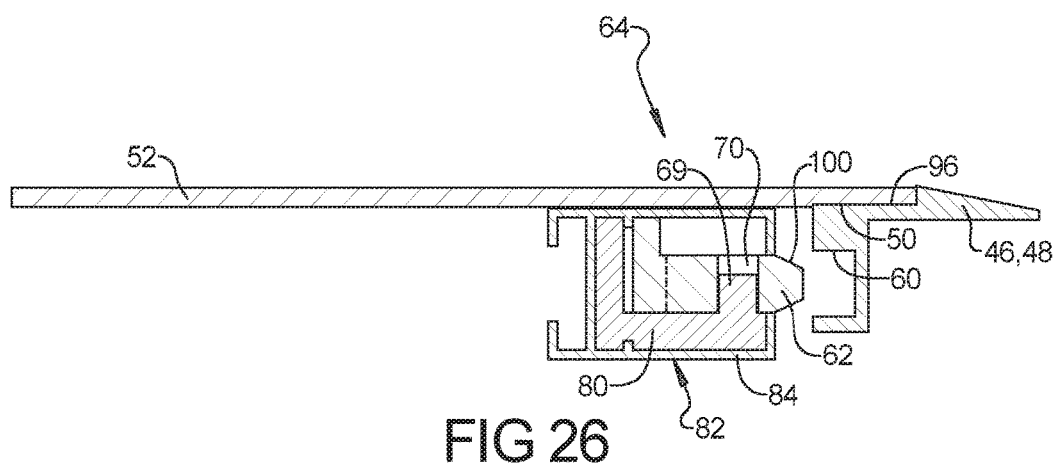
FIG. 26 is a partial cross sectional view of the automatic latch of FIG. 18 and related components in the unlocked or unlatched position or configuration.

The biasing member 66, such as the illustrated spring, can bias the automatic latch 62 and arm 80 of the latch actuator 76 toward corresponding unlatched or unlocked positions (FIGS. 25 and 26). The latch actuator 76 can extend from the automatic latch 62 to the respective latch-rearward rectangular element 78. As each latch-rearward rectangular element 78 is rotated or pivotably hinged toward the folded or storage configuration, the biasing member 66 causes the arm 80 to push against the latch-rearward rectangular element 78 and to extend from the housing 82 of the respective automatic latch 62 and toward its unlatched configuration. In some cases, the arm 80 including bumper 112 can extend outward from and past the rearward edge or periphery of the rectangular element end 64, and can extend to a position within the periphery of the corresponding latch-rearward rectangular elements 78, in its unlatched configuration.

Thus, there is no need to separately manually operate the automatic latches. The act of folding up each latch-rearward rectangular element 78 of the tonneau cover 44 alone, without any other manual manipulation, automatically unlatches each automatic latch 62 of each rectangular element end 64 prior to needing to pivot the corresponding rectangular element 52 itself toward the folded or storage configuration (FIG. 16).

Figure 23:
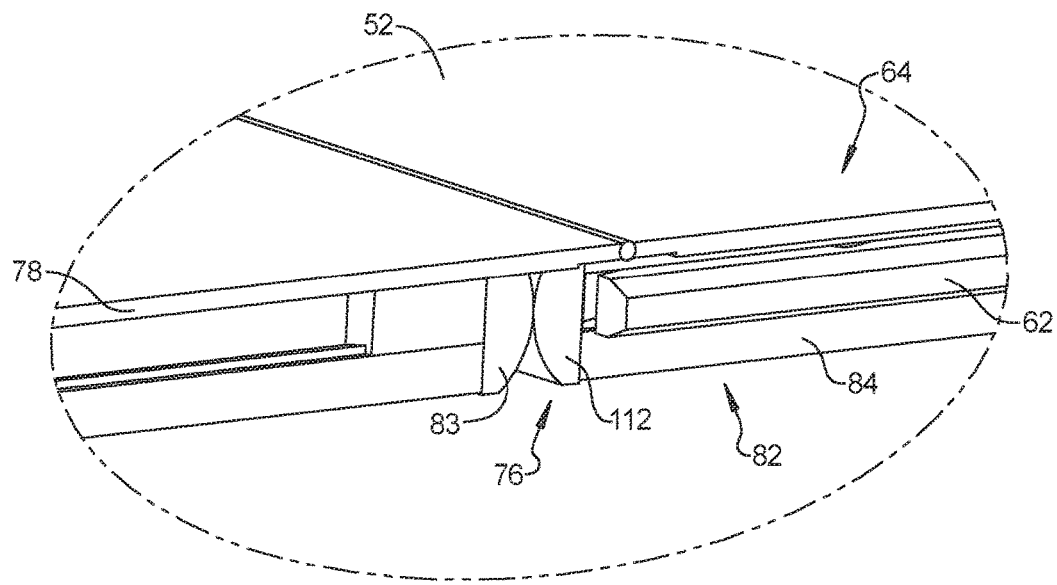
FIG. 23 is a partial perspective view of the automatic latch of FIG. 18 and related components, including a corresponding latch-rearward rectangular element, in a locked or latched position or configuration.
Figure 24:
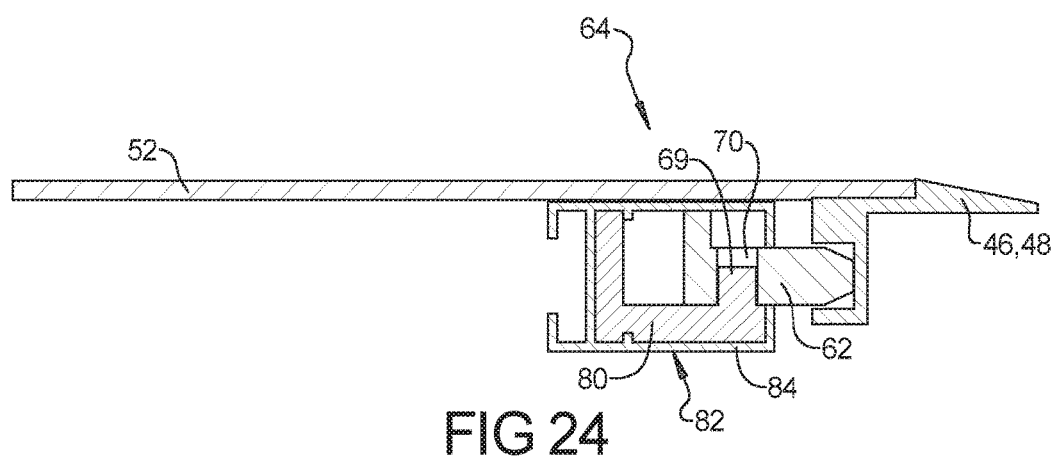
FIG. 24 is a partial cross sectional view of the automatic latch of FIG. 18 and related components in the locked or latched position or configuration.

Similarly, the act of unfolding the tonneau cover 44 alone can automatically latch each automatic latch 62. During unfolding, each rectangular element 52 having a rectangular element end 64 carrying an automatic latch 62 can be moved into its unfolded, closed, or extended position against the side rails 46, 48 while the automatic latch 62 and latch actuator arm 80 is held in its unlatched or unlocked position by the spring 66. Then, as the corresponding latch-rearward rectangular element 78 is pivoted into its unfolded position against the side rails 46, 48, the fixed forward end cap 83 of the latch-rearward rectangular element 78 can engage against the bumper 112 to push against the latch actuator 76, moving arm 80 and automatic latch 62 into their corresponding latched configurations (FIGS. 23, and 24).

As discussed above, the latch actuator 76 can engage against the corresponding latch-rearward rectangular element 78 during pivotable movement of the latch-rearward element 78 relative to the corresponding rectangular element end 64 as the latch-rearward element 78 is moved between its closed and open positions. The engagement during this relative pivotable movement need not be throughout the entirety of this relative pivotable movement.

As in this embodiment, each rectangular element end 64 and respective latch-rearward rectangular element 78 can be comprised of an adjacent pair of rectangular elements 52. In addition, a first automatic latch 62 can be coupled to a first element end 64 at a first side of the tonneau cover 44. A second automatic latch 62 can be coupled to a second element end 64 at a second, opposite side of the tonneau cover 44. The first and second rectangular element ends 64 can be opposite ends of the same one of the rectangular elements 52 and the corresponding latch-rearward rectangular elements 78 can be an adjacent one of the rectangular elements 52. Alternatively, the first and second rectangular element ends 64 can be ends of different rectangular elements 52 and the respective latch-rearward rectangular elements 78 can comprise different adjacent pairs of the rectangular elements 52.

As in this embodiment, a manual latch 72 with a grasping portion 74 can be provided on opposite ends of the rear rectangular element 56. In some cases, a single manual latch can be provided. To fold up the tonneau cover 44 from the extended configuration of FIG. 13, the manual latches 72 are manually moved into their unlatched configurations using the handle 74. This permits the rear rectangular member 56 to be folded onto the adjacent rectangular member 57. To the extent the rear rectangular member 56 is a latch-rearward rectangular member 78 for automatic latches 62 of opposite rectangular element ends 64 of the adjacent rectangular element 57, this operation alone unlatches these automatic latches 62 as described above.

Figure 15:
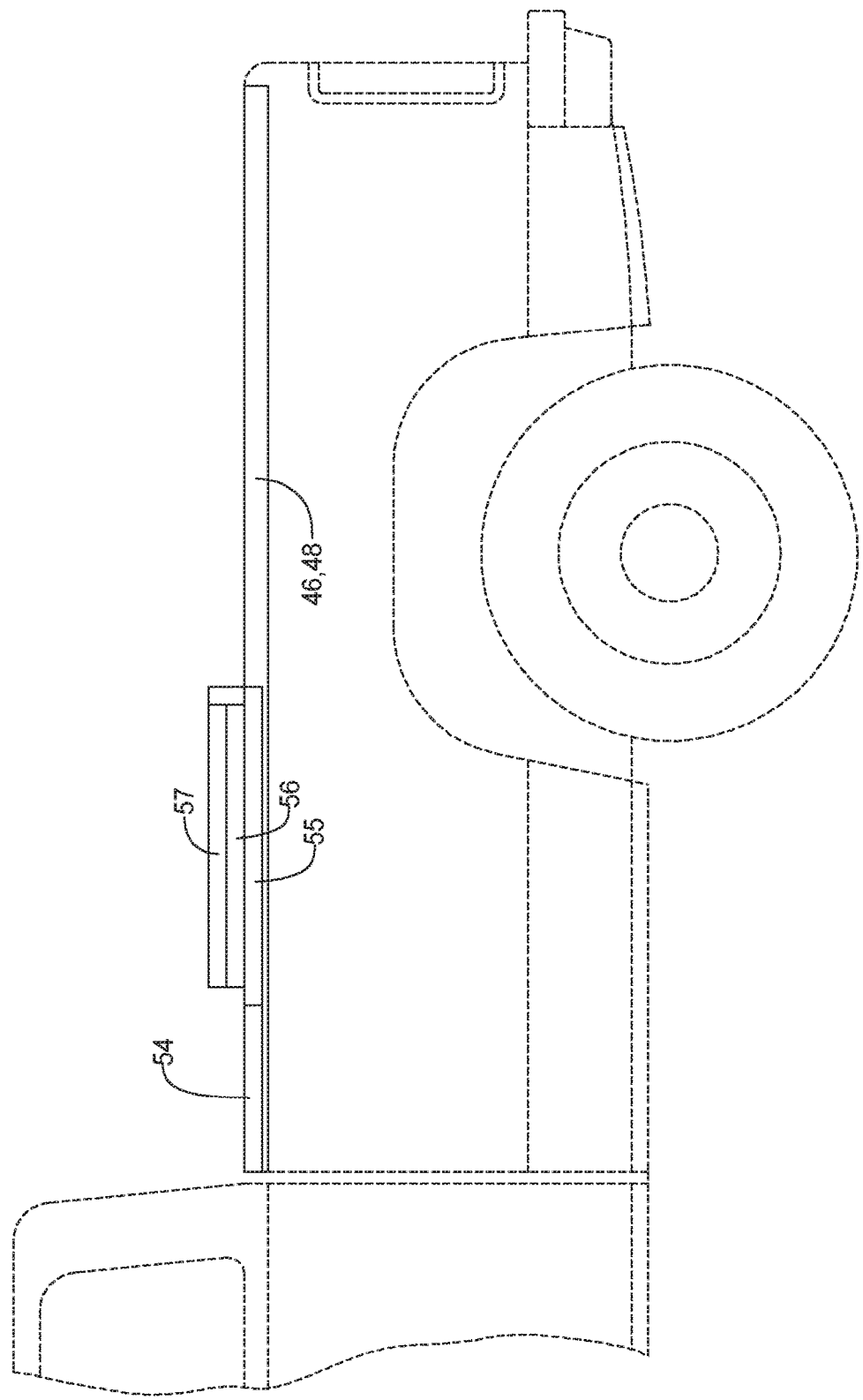
FIG. 15 is a side elevation view of the example tonneau cover system of FIG. 13 in a first open or retracted storage configuration.

With any automatic latches 62 of the adjacent rectangular element 57 unlatched, the rectangular element 57 can be folded onto next adjacent rectangular element 55 as illustrated in FIG. 15. Similarly, to the extent the adjacent rectangular member 57 is a latch-rearward rectangular member 78 for automatic latches 62 of opposite rectangular element ends 64 of the next adjacent rectangular element 55, this operation alone unlatches these automatic latches 62, as described above. With any automatic latches 62 of the next adjacent rectangular element 55 unlatched, the rectangular element 55 can be folded onto the next adjacent or forward rectangular element 54 or pivoted into a raised position that can correspond to the final open or retracted storage configuration as illustrated in FIG. 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable or can be used in other embodiment, even if not specifically shown or described. The same may also be varied in many ways. Such variations are not to be regarded as a departure from the disclosure, and all such modifications are intended to be included within the scope of the disclosure.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover system for a truck cargo box including a forward end and a rear end, and first and second side walls therebetween, the tonneau cover system comprising:
    a tonneau cover including a plurality of rectangular elements including a forward and a rear rectangular element, and a first and a second latch-rearward rectangular element, the plurality of rectangular elements having opposite ends supportable by the first and second side walls, respectively, and the rectangular elements being pivotally connected together and moveable between a closed position in which the rectangular elements are in an extended configuration to cover the cargo box, and an open position in which the rectangular elements are in a retracted storage configuration to allow access to the cargo box;
    a first and a second automatic latch coupled to a first and a second rectangular element end at a first and a second side of the tonneau cover, respectively, the first and second rectangular element ends each being an end of any rectangular element intermediate the forward and rear rectangular elements, and each of the first and second automatic latches having a latched configuration in which each automatic latch is latched to the first and second side walls, respectively, of the cargo box, and an unlatched configuration in which each automatic latch is unlatched from the first and second side wall, respectively;
    a first and a second latch actuator extending from the first and second automatic latch, respectively, to the first and second latch-rearward rectangular element, respectively, that is rearward of the first and second rectangular element end, respectively, wherein movement of the first latch-rearward rectangular element relative to the first rectangular element end, as the tonneau cover moves between the closed and open positions, moves the first latch actuator which moves the first automatic latch between the latched and unlatched configurations, and wherein movement of the second latch-rearward rectangular element relative to the second rectangular element end, as the tonneau cover moves between the closed and open positions, moves the second latch actuator which moves the second automatic latch between the latched and unlatched configurations, respectively;

wherein the first and second latch actuators are anchored to the first and second latch-rearward rectangular elements, respectively, and the first and second latch-rearward rectangular elements pull against the first and second latch actuators, respectively, to move the first and second latch actuators which moves the first and second automatic latches from the latched to the unlatched configurations or vice versa.

2. The tonneau cover system of claim 1, wherein the first and second latch actuators comprise at least one actuation cable.

3. The tonneau cover system of claim 2, wherein the at least one latch actuation cable comprises a first actuation cable coupled to the first automatic latch and a second actuation cable coupled to the second automatic latch, and wherein the first and second latch actuation cables are independently anchored to the respective first and second latch-rearward rectangular elements.

4. The tonneau cover system of claim 2, wherein the first and second latch-rearward rectangular elements are a same one of the rectangular elements.

5. The tonneau cover system of claim 2, wherein the first and second rectangular element ends are opposite ends of a same one of the rectangular elements.

6. The tonneau cover system of claim 2, wherein each of the first and second actuation cables includes a first portion that extends between the respective first and second automatic latch and an intermediate anchor, and a second portion that extends at an angle relative to the first portion and between the intermediate anchor and a terminal anchor coupled to the first and second latch-rearward rectangular elements, respectively.

7. The tonneau cover system of claim 2, wherein the tonneau cover is a roll-up tonneau cover with the retracted storage configuration being a rolled-up configuration, and each of the rectangular elements comprises a rigid slat.

8. The tonneau cover system of claim 1, further comprising at least one manual latch coupled to the rear rectangular element, and being manually actuated to move the manual latch from a latched configuration in which the manual latch is latched to one of the side walls of the cargo box, to an unlatched configuration in which the manual latch is unlatched from the one of the side walls.

9. The tonneau cover system of claim 8, further comprising first and second side rails coupleable to the first and second side walls, respectively, and wherein the first and second automatic latches and the manual latch are each indirectly latched to the respective side wall of the cargo box in the latched configuration by being latched to the respective side rail.

10. The tonneau cover system of claim 9, wherein the opposite ends of the plurality of rectangular elements are indirectly supportable by the first and second side walls by being supportable on respective support flanges of the first and second side rails, and wherein the side rails each include a latching flange positioned above the support flange, and wherein the automatic latches are latched to the latching flanges, respectively, in the latched configuration.

11. The tonneau cover system of claim 1, wherein the rectangular elements of the tonneau cover include lower surfaces upon which the rectangular elements rest in the closed position, and the first automatic latch has a latching surface positioned above the lower support surfaces in the closed position.

12. The tonneau cover system of claim 1, further comprising a biasing member operably coupled to each of the first and second automatic latches to bias the automatic latch toward the latched configuration.

13. A tonneau cover system for a truck cargo box including a forward end and a rear end, and first and second side walls therebetween, the tonneau cover system comprising:
a tonneau cover including a plurality of rectangular elements including a forward and a rear rectangular element, and a first and a second latch-rearward rectangular element, the plurality of rectangular elements having opposite ends supportable by the first and second side walls, respectively, and the rectangular elements being pivotally connected together and moveable between a closed position in which the rectangular elements are in an extended configuration to cover the cargo box, and an open position in which the rectangular elements are in a retracted storage configuration to allow access to the cargo box;
a first automatic latch coupled to a first rectangular element end at a first side of the tonneau cover, the first rectangular element end being an end of any rectangular element intermediate the forward and rear rectangular elements, and the first automatic latch having a latched configuration in which the first automatic latch is latched to a first side wall of the cargo box, and an unlatched configuration in which the first automatic latch is unlatched from the first side wall;
a first latch actuator extending from the first automatic latch to a first latch-rearward rectangular element that is rearward of the first rectangular element end, wherein movement of the first latch-rearward rectangular element relative to the first rectangular element end, as the tonneau cover moves between the closed and open positions, moves the latch actuator which moves the first automatic latch between the latched and unlatched configurations, respectively.

14. The tonneau cover system of claim 13, further comprising a second automatic latch coupled to a second rectangular element end at a second side of the tonneau cover, the second rectangular element end being an end of any of the rectangular elements other than the rear rectangular element, and the second automatic latch having a latched configuration in which the second automatic latch is latched to the second side wall of the cargo box, and an unlatched configuration in which the second automatic latch is unlatched from the second side wall; and
a second latch actuator extending from the second automatic latch to a second latch-rearward rectangular element that is rearward of the second rectangular element end, wherein movement of the second latch-rearward rectangular element relative to the second rectangular element end, as the tonneau cover moves between the closed and open positions, moves the second latch actuator which moves the second automatic latch between the latched and unlatched configurations, respectively.

15. The tonneau cover system of claim 14, further comprising first and second side rails coupleable to the first and second side walls, respectively, and wherein the first automatic latch are each indirectly latched to the respective side wall of the cargo box in the latched configuration by being latched to the respective first and second side rail.

16. The tonneau cover system of claim 15, wherein the opposite ends of the plurality of rectangular elements are indirectly supportable by the first and second side walls by being supportable on respective support flanges of the first and second side rails, and wherein the side rails each include a latching flange positioned above the support flange, and wherein the automatic latches are latched to the latching flanges, respectively, in the latched configuration.

17. The tonneau cover system of claim 13, wherein the rectangular elements of the tonneau cover include lower surfaces upon which the rectangular elements rest in the closed position, and the first automatic latch has a latching surface positioned above the lower support surfaces in the closed position.

18. The tonneau cover system of claim 13, further comprising at least one manual latch coupled to the rear rectangular element, and being manually actuated to move the manual latch from a latched configuration in which the manual latch is latched to one of the side walls of the cargo box, to an unlatched configuration in which the manual latch is unlatched from the one of the side walls.

19. The tonneau cover system of claim 13, wherein the first and second rectangular element ends are opposite ends of a same one of the rectangular elements.

20. The tonneau cover system of claim 18, wherein the first and second latch-rearward rectangular elements are a same one of the rectangular elements.

21. The tonneau cover system of claim 13, further comprising a first biasing member operably coupled to the first automatic latch to bias the first automatic latch toward the latched configuration, and wherein the latch-rearward rectangular element pulls the first and second latch actuators against a biasing force of the first biasing member to move the first latch actuator which moves the first automatic latch from the latched to the unlatched configuration.

22. The tonneau cover system of claim 13, further comprising a first biasing member operably coupled to the first automatic latch to bias the first automatic latch toward the unlatched configuration, and wherein the latch-rearward rectangular element pushes the first and second latch actuators against a biasing force of the first biasing member to move the first latch actuator which moves the first automatic latch from the unlatched to the latched configuration.

23. A tonneau cover system for a truck cargo box including a forward end and a rear end, and first and second side walls therebetween, the tonneau cover system comprising:
a tonneau cover including a plurality of rectangular elements including a forward and a rear rectangular element, and a first and a second latch-rearward rectangular element, the plurality of rectangular elements having opposite ends supportable by the first and second side walls, respectively, and the rectangular elements being pivotally connected together and moveable between a closed position in which the rectangular elements are in an extended configuration to cover the cargo box, and an open position in which the rectangular elements are in a retracted storage configuration to allow access to the cargo box;
a first and a second automatic latch coupled to a first and a second rectangular element end at a first and a second side of the tonneau cover, respectively, the first and second rectangular element ends each being an end of any rectangular element intermediate the forward and rear rectangular elements, and each of the first and second automatic latches having a latched configuration in which each automatic latch is latched to the first and second side walls, respectively, of the cargo box, and an unlatched configuration in which each automatic latch is unlatched from the first and second side wall, respectively;
a first and a second latch actuator extending from the first and second automatic latch, respectively, to the first and the second latch-rearward rectangular element, respectively, that is rearward of the first and second rectangular element end, respectively, wherein movement of the first latch-rearward rectangular element relative to the first rectangular element end, as the tonneau cover moves between the closed and open positions, moves the first latch actuator which moves the first automatic latch between the latched and unlatched configurations, respectively, and wherein movement of the second latch-rearward rectangular element relative to the second rectangular element end, as the tonneau cover moves between the closed and open positions, moves the second latch actuator which moves the second automatic latch between the latched and unlatched configurations, respectively;
wherein, during movement between the closed and the open positions, the first and second latch actuators engage against the first and second latch-rearward rectangular elements, respectively, and the first and second latch-rearward rectangular elements push against the first and second latch actuators, respectively, to move the first and second latch actuators which moves the first and second automatic latches from the unlatched to the latched configurations or vice versa.

24. The tonneau cover system of claim 23, wherein the first and second latch actuators comprise a first and a second movable arm extending outward from the first and second rectangular ends, respectively.

25. The tonneau cover system of claim 24, wherein the first and second rectangular element ends are opposite ends of a same one of the rectangular elements.

26. The tonneau cover system of claim 25, wherein the first and second latch-rearward rectangular elements are both a same one of the rectangular elements that is adjacent the same rectangular element.

27. The tonneau cover system of claim 24, wherein a first pair of adjacent rectangular elements comprises the first rectangular element end and the first latch-rearward rectangular element, and a second pair of adjacent rectangular elements comprises the second rectangular element end and the second latch-rearward rectangular element.

28. The tonneau cover system of claim 23, further comprising a first and a second biasing member operably coupled to the first and second automatic latches, respectively, to bias the automatic latches toward the unlatched configuration.

29. The tonneau cover system of claim 28, wherein the first and second biasing members engage against and bias the first and second movable arms, respectively, against the first and second latch-rearward rectangular elements, respectively, during movement between the open and closed positions.

30. The tonneau cover system of claim 28, wherein the first and second latch-rearward rectangular elements push against the first and second movable arms, respectively, as the first and second latch-rearward rectangular elements are moved into the closed position which moves the first and second latches against the first and second biasing members, respectively, and toward the latched configuration.

31. The tonneau cover system of claim 23, wherein the tonneau cover is a fold-up tonneau cover with the retracted storage configuration being a folded-up configuration, and each of the rectangular elements is a rectangular section comprising a rigid panel.

32. The tonneau cover system of claim 23, wherein the tonneau cover is a fold-up tonneau cover with the retracted storage configuration being a folded-up configuration, and each of the rectangular elements is a rectangular section comprising a rigid frame covered by a flexible sheet material.

33. The tonneau cover system of claim 23, further comprising at least one manual latch coupled to the rear rectangular element, and being manually actuated to move the manual latch from a latched configuration in which the manual latch is latched to one of the side walls of the cargo box, to an unlatched configuration in which the manual latch is unlatched from the one of the side walls.

34. The tonneau cover system of claim 33, further comprising first and second side rails coupleable to the first and second side walls, respectively, and wherein the first and second automatic latches and the manual latch are each indirectly latched to the respective side wall of the cargo box in the latched configuration by being latched to the respective side rail.

* * * * *